US005694335A

United States Patent [19]

Hollenberg

[11] Patent Number: 5,694,335
[45] Date of Patent: Dec. 2, 1997

[54] SECURE PERSONAL APPLICATIONS NETWORK

[76] Inventor: Dennis D. Hollenberg, 313 Fourteenth St., Pacific Grove, Calif. 93950-3408

[21] Appl. No.: 613,725

[22] Filed: Mar. 12, 1996

[51] Int. Cl.$^6$ ...................................................... H04L 9/00
[52] U.S. Cl. ...................................... 364/514 C; 395/112
[58] Field of Search ........................ 364/514 C; 395/112, 395/275; 380/4; 360/132; 340/825.15, 825.32

[56] References Cited

U.S. PATENT DOCUMENTS

| | | | |
|---|---|---|---|
| 3,692,965 | 9/1972 | Gandner | 200/43.07 |
| 4,217,488 | 8/1980 | Hubbard | 395/112 |
| 4,553,127 | 11/1985 | Issa | 307/10.3 |
| 4,832,146 | 5/1989 | Luby | 180/287 |
| 5,065,262 | 11/1991 | Blackborow et al. | 360/75 |
| 5,128,551 | 7/1992 | Clokie | 307/10.1 |
| 5,153,558 | 10/1992 | Robinson et al. | 340/428 |
| 5,162,164 | 11/1992 | Dougherty et al. | 429/9 |
| 5,184,023 | 2/1993 | Carlo et al. | 307/10.3 |
| 5,404,129 | 4/1995 | Novak et al. | 340/428 |
| 5,552,776 | 9/1996 | Wade et al. | 340/825.31 |

OTHER PUBLICATIONS

Kent et al., Encyclopedia of Computer Science and Technology, 1990 (no month), pp. 153–162.

Primary Examiner—Ellis B. Ramirez
Assistant Examiner—Thomas Peeso

[57] ABSTRACT

An extensible, programmable digital electronic network (14A") originates from a network node (FIG. 1), including a base node microcomputer (90) and a network interface (71C), and is operatively connected to a power supply (61), and at least one separate, network communicating circuit or network node (21), which is connected to at least one application device (21A). Enclosing cases of the network components includes an access sensor (8, 18C, and 22F, respectively) and power storage units (24G, 18B, and 22H, respectively) for fail-safe functions. The application device is programmably controlled by the base node microcomputer, a network security main program (100), a separate circuit or node, and a node security main program (130) to cause the network to selectably effect control of a device, for example, upon loss of network integrity, such that the network and node, respectively, enter programmably secure conditions (125, 155). These conditions include disconnecting the power supply from certain controlled system circuits including vehicle engine starting or ignition (5B') or one or more nodes causing application devices to function.

19 Claims, 10 Drawing Sheets

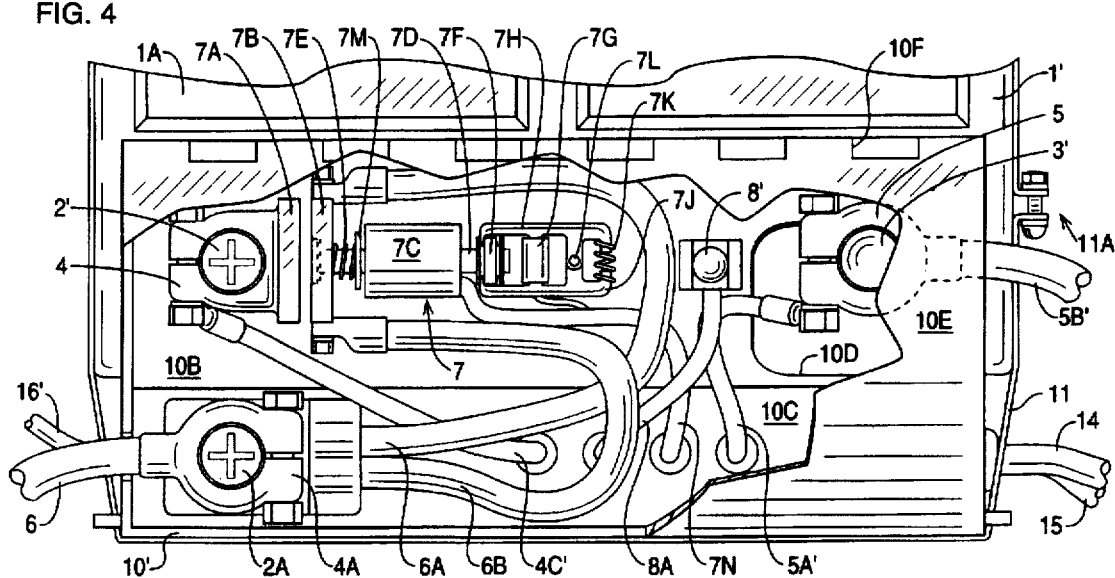
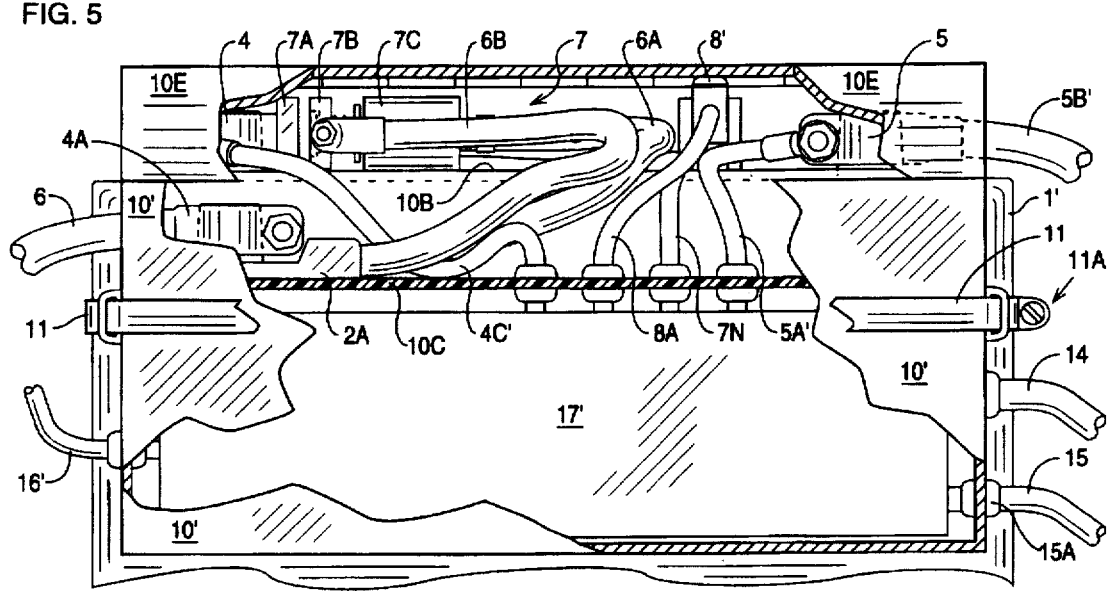

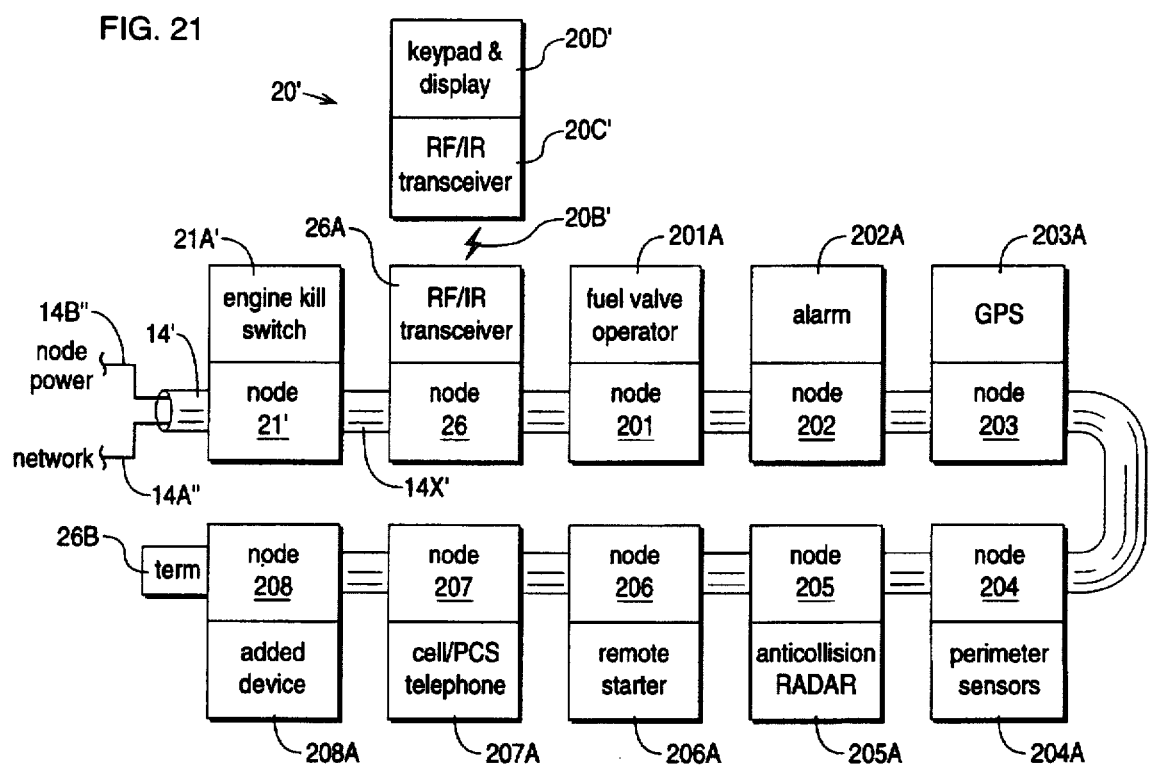

SECURE PERSONAL APPLICATIONS NETWORK

BACKGROUND—FIELD OF THE INVENTION

This invention relates to computer networks, specifically to secure, easily extensible networks.

BACKGROUND—GENERAL DISCUSSION

The current downsizing in business and government is accompanied by reductions in traditionally reliable societal, business, and financial resources. In trying to compensate in these fast-paced times, many people are being forced to become more capable. The range of tasks each person must accomplish to ensure adequate income, personal safety, security of possessions, and time to enjoy life are increasing. Needed are new kinds of computer-based systems to help people function with greater personal capability.

Nearly 50 million U.S. citizens are physically challenged, 750 million worldwide. The vast majority could benefit from capability enhancements ranging from telerobotic and mobility aids to sensory annunciators. In many cases, a number of simple, comparatively inexpensive devices that elegantly coordinate their actions could render complex, custom services to those requiring them. Some of the devices might be prosthetic in nature; all would intercommunicate to adjust their actions to their constantly changing functional environments.

With the populations of many countries of the world aging, similar kinds of labor-saving systems of devices could find many applications in and around the home. Needed are mass-produced modules that are easily customizable for home security, safety, labor-saving, home and entertainment control, and entertainment applications. But because the home automation systems currently on the market are expensive, limited in their flexibility and capability, and are difficult to install and maintain, most would-be purchasers are eliminated.

The home automation market will remain small because the prices of systems are high due to low annual sales as compared to the personal computer (PC) market. This high-cost, low-volume market condition will persist until a simple, mass-merchandised automation platform succeeds in the consumer-product market. Needed is a new type of inexpensive, off-the-shelf, extensible, reliable, computing platform that is very simple to install, expand, and operate.

Coincident with the centenary (1996) of the production automobile in the U.S., speed limits are being raised on many of the nation's highways. Annual highway deaths can be expected to approach 100,000, the population of Santa Clara, Calif. In 1993 the U.S. financial loss to automobile accidents totaled $167.3 billion. Many accidents could be prevented if automobiles were equipped with capability-enhancement devices to assist the driver, such as active SONAR sensors to warn of cars in a driver's blind spot. With more than 150 million automobiles on U.S. roads today, vulnerable components like the battery, for example, have remained effectively unreliable from day one.

Today, the cost due to missed appointments and time wasted by the automobile battery's failure outweighs the cost of carrying a spare battery. Worse, a dead battery in a seldom visited backwoods can have serious consequences. Aside from the cost, the lack of battery improvement, redundancy, or battery-power management and condition-reporting systems in automobiles, suggests that the battery is viewed as an incidental commodity by the automobile industry. In contrast, the marine and aircraft industries treat the battery as an emergency or critical auxiliary power supply.

In automobile-related emergencies or potential theft situations, automobile batteries can be the primary power source. In that view, as the security-system power source and, therefore, center for exercising control over engine starting, the simple car battery becomes centrally important to preserving the safety of passengers and ownership value of the automobile. That potential central importance has not, until now, been utilized.

Over 1.6 million motor vehicles are stolen each year in the U.S., a $10 billion insured loss largely shared by all insured motorists. Only one out of seven stolen vehicles is recovered. In a comparison of annual insurance premiums for two different $30,000 automobiles, one costs $900 more simply because car thieves desire it. While questionable theft-deterrent devices like alarms and steering wheel bars abound, reliable aftermarket theft-prevention systems can run into thousands of dollars. Needed are multiple, self-coordinating devices, each of which performs specialized tasks to counter theft: immobilization devices, a communicating device, and a location transponder.

The problems involved in preventing vehicle theft are a distillation of the criteria involved in providing personal-capability-enhancement devices addressed here. These criteria are: fail-safe and fail-secure, reliable continuous operation; easy customizability and extensibility of the system; availability of a very wide range of application-device types; and low cost. Solving these disparate issues indicates a novel approach.

BACKGROUND—DISCUSSION OF PRIOR ART

Personal Computers and Industrial Control Networks

The engineering of computer systems remains prohibitively expensive in all but high-volume merchandising situations. Yet, mass-merchandise can't accommodate specific individuals' needs. Interestingly, one million instructions per second (MIPS) of microcomputer power, particularly that of embedded microcontrollers, costs about the same as a small candy bar. Thus, while a microcomputer having a useful number of MIPS costs about the same as a modest dinner, the engineering costs to make those MIPS useful for specific applications can equal several years of average income. Clearly, the capacity for rendering the potential of microcomputers into customized, useful tools must come from inexpensive, flexible computing platforms modelled after the PC.

While the ubiquitous PC, with monitor and keyboard, owned by about a third of Americans is a high-utility platform, it has four major limitations for the purposes here. First, even as a sub-laptop the PC is too big and vulnerable to fit unobtrusively and safely in all the places and environments where needed, even as a local area network (LAN) server. Second, the primitive architecture of the PC, adhering to the support requirements of outdated computer programs, so-called "legacy software", limits its robustness, fault tolerance, security, and flexibility under the demands of current, increasingly large and complex programs.

The third limitation is that the PC is an economic casualty of its own success as witnessed by the new class of cheaper, scaled-down computers dedicated to internet use, so-called "network computers" and "internet appliances". The PC is increasingly loaded with options such as CD-ROMS, sound systems, and more memory so its average price has actually increased $400 since 1993 to $1700 in 1995.

3

Fourth, related to the second and third limitations above is the ingrained problem of unreliable PC compatibility between vendors due to small variations in components and software. While not individually dysfunctional, these variations can conspire to thwart operation of a new application or device, or produce unintended results in peculiar situations. Centralized-processor architectures like that of the PC are rigidly dependent upon the operating fidelity of their entire system. Such systems are inherently more "brittle" than distributed architectures, especially when used in the specialized situations demanded of customized applications.

Currently available industrial control systems provide only limited network bandwidth or speed. For example, current high-speed industrial control networks only provide up to 1.25 Mbits/second transmission rates; most, such those using power-line modems, offering less than a tenth of that speed (In contrast, current infrared-wireless handheld computers provide up to 4 Mbits/second transmission speeds over about three feet). In addition, the fastest of these systems are proprietary and require comparatively expensive development systems which both increases the cost of application devices and limits their selection to expensive industrial models. Because none provide "plug and play" and easy configuration, such systems, for enhancing personal capability, are beyond consumers' reach.

BACKGROUND—DISCUSSION OF PRIOR ART

Automobile Theft Deterfence and Prevention

The field of automobile theft deterfence and prevention is the archetype of the broader personal capability enhancement field. There currently is no single, automobile-aftermarket device that prevents theft. The control nexus of any security system is its power supply, for the vehicle that critical knot is control over the battery. Various types of battery disconnecting switches have been proposed. Gardner U.S. Pat. No. 3,692,965 (1972) shows a flexible pull wire running from the battery switch to the passenger compartment and a key lock accessible through the open hood, Luby U.S. Pat. No. 4,832,146 (1989) also shows that the hood must be opened to access the key-operated battery switch, and Clokie U.S. Pat. No. 5,128,551 (1992) shows a switch in a compartment but with battery cables accessible, and therefore its security can be circumvented by shunts, under the hood. The Gardner and Luby arts can be defeated by removing the switch box from the battery.

Other automobile theft-deterrent systems show many similar features. Robinson et al. U.S. Pat. No. 5,153,558, (1992) shows a circuit including a battery reconnect signal integrated with various intrusion sensors. Novak et al. U.S. Pat. No. 5,404,129 (1995) shows a high starting-current interrupt circuit including a frequency modulation (FM) receiving override signal required for normal operation. Using an operating method similar to the Novak art is Carlo et al. U.S. Pat. No. 5,184,023 (1993) showing a switch to interrupt high starting current including receiving a radio frequency (RF) override signal. Issa U.S. Pat. No. 4,553,127 (1985) shows a high starting current limiting circuit with various types of override accessory components.

All the aforementioned seven arts can be defeated by adding a shunt wire from the battery to the starter or, alternatively, simply by removing the existing battery and connecting a replacement battery. In addition, the Robinson art has no mode or method for confirming one door status detector signal by another, separate signal. Failing to provide separate, confirming sensor signals, a typical failure of conventional alarm types, makes a system susceptible to spurious alarms due to balky sensors or non-intrusive events.

4

In the area of battery redundancy Dougherty et al. U.S. Pat. No. 5,162,164 shows a housing including a dual wet-lead-acid main battery, a smaller reserve battery, and various immovable or manual interconnection components. This art refers to a specific, dated battery technology and is difficult to apply to an increasing number of new technologies. In the end, an expensive vehicle, many of which today are priced at $30 thousand and up, can simply be hauled away by thieves using a truck. In that case, a useful theft-deterrent would need a position-transmitting device.

SUMMARY OF THE INVENTION

The secure personal applications network relates to extensible, digital electronic control networks, programmable, functionally independent and intercommunicating microcomputer and microcontroller nodes with multiple-levels of secure and safe failure protection, and simple-to-modify network node programs. This combination provides a platform for implementing and controlling a new class of secure, practical, and flexibly useful electronic and electromechanical tools and devices. Non-technical users will find these tools to be simple and useful elements of systems ultimately capable of providing significant, customizable capabilities.

The digital electronic network, where the term, electronic, includes circuits employing wireless or electromagnetic wave radiation, e.g., radio frequency (rf), infrared (jr), laser, and light waves, is ubiquitously used to communicate or transfer digital information between separate digital computers, systems, or nodes. Other than a physical medium and language in common, a network of nodes, including power supplies, requires adequate speed of information transfer, or bandwidth. The network's inherent extensibility enables users to increase the system's capability simply by adding separate, comparatively inexpensive application nodes which can act alone, or coordinate their activities as necessary, to produce the spatially and temporally diverse and complex functions useful in the physical world. Importantly, the network's bandwidth must be sufficient to prevent degraded performance when more nodes are added; a number of network types apply to the embodiments described herein. As discussed regarding natural information processing systems, complex system behavior in the real world requires both large numbers of processing elements or nodes and high-speed communications or bandwidth (Hollenberg, D. "Information Processing Systems", in *Encyclopedia of Computer Science and Technology*, vol. 26, supplement 6 (A. Kent and J. G. Williams, eds.) Marcel Dekker, Inc., New York, pp. 153–162, 1990).

The nodes themselves may be any type of computer or controller—providing their architectures are compatibly implemented so that they can intercommunicate. One method of intercommunication is the base, or main node, polling, or requesting a response, and responding by separate, that is, distributed, nodes. If the base node fails to poll or a separate node does not respond, programmably independent action is taken to render the system secure against unauthorized use, intrusion, or tampering.

Further, through its electrodes, the battery provides a dependable supply of power to each component or circuit of the extensible digital network's base node. The term, "circuit" herein means the minimum portion of electric or electronic circuits, including electromagnetic wave radiative media, which produces or could produce a desired effect. Further, for purposes here, "electrode" means the electrical connection elements permanently fixed to the battery and across which, in practice, the battery's greatest voltage potential is available. An additional capability of the network base-node programmable microcomputers, which includes microcontrollers, is automatically switching the supply of high-current battery power to electrical loads such as a vehicle-engine starting motor under appropriate conditions. In the event of attempted unauthorized use, system tampering, or vehicle upset, the system can be preprogrammed to open these or operate other switches, as well as providing for other functions, to prevent starting or to halt engine or equipment operation or to cause alarms to sound, etc.

Particularly applicable to multiple battery embodiments, the microcomputer can control the charging and maintenance of the batteries in a manner tailored to maximize a specific battery type's useful life. For example, one battery of a two-battery bank can provide power to its loads while the second battery is charged when its optimum discharge capacity is reached.

By locating one digital computer node at or within the battery, also referred to as the base node or network logical circuits herein, the battery bank's charging and discharging can be automatically managed. Peukert's equation enables the calculation of a battery's available capacity at a given discharge current and within a given time period:

$$I(\exp n)t = C$$

where C is the capacity of the battery in ampere-hours and is treated as a constant, I is the discharge current in amperes, t is the time of discharge in hours, and n, an exponent ranging from more than 1 to about 2, is a constant for any given battery type and relates to its construction. By test discharging a given battery type twice, each at a different discharge currents, e.g., 25 and 5 amps, n is calculated accordingly (positive values only):

$$n = \frac{\Delta t}{\Delta I} = \frac{\log t2 - \log t1}{\log I1 - \log I2}$$

Incorporating this equation, as well as others for determining other parameters, as an algorithm in the base node of the secure personal applications network is comparatively straightforward. Hence, by periodically calculating C, the associated battery or batteries can be precisely maintained by the appropriate regimen of discharge use and recharging in order to optimize the battery's useful life. The capacity, C, can also be programmatically reduced over time to reflect aging of the battery system. Additionally, the computed capacity can be transmitted to a remote display unit node at operator command.

OBJECTS AND ADVANTAGES

Accordingly, several objects and advantages of the secure personal applications network are to provide as follows:

a system for personal capability enhancement.

an easy-to-use "fail safe, fail secure" network and controlled system or systems.

a network having four levels of security: at the network level due to the response to loss of network integrity; at the network level due to specific application-node functions like detectors and alarms; at the network-node level wherein each node responds independently to loss of network integrity; and at the application-device level wherein the device responds independently to the loss of integrity of the node-to-device cable.

a secure, extensible, distributed architecture, multiple computer system.

an electric or electronic system packaged inside its power storage unit.

an electronic system for research data collection, surveillance, and control of other systems which can operate unattended in a reliable and secure manner.

a network in which the base-node circuits are encased within a power supply, can sense any attempt to gain unauthorized access, and can be programmed in different ways to render the network and controlled system secure from such access.

easy programming of a secure network through the use of a wireless computer or other type of digital device.

a simple-to-use, standardized network platform to which a wide range of application nodes can be operatively connected and includes a built-in power-source backup using batteries or capacitors.

a network with a security program which, when standard nodes are added to the network or the network is appropriately changed, automatically incorporates the added node's operating functions and characteristics as it reconfigures itself to allow non-technical operators to use it, also called, "plug and play".

a system of digitally controllable electrical and electronic components in a removable cassette, to which cables can be attached and which can be programmed, secured within the weathertight structure of a reliable power storage unit.

a flexible control system with a built-in alternate power source for use in emergency or remote situations for applications including communication, command, and control in which one or more power-generation application nodes, such as solar panel devices, can be connected and controlled.

a network having coordinated network application nodes for vehicles that can include kill switches, fuel-shutoff valves, perimeter or side-looking SONAR, front and rear RADAR or collision detectors, anti-intrusion alarms, anti-theft transmission locking devices, global positioning by satellite (GPS) systems, telecommunications devices, key pad entry and ignition access devices, engine systems monitors, and interfaces for fax machines, and personal computers.

a network having coordinated network application nodes for homes or buildings that include perimeter security systems, emergency lighting systems, smoke and gas detection systems, child monitoring devices, telecommunications management systems, entry-way video or screening systems, entertainment system management devices, and computer network interfaces.

a network having coordinated network application nodes for the physically challenged including telephone and door-bell annunciators, voice-activated appliance-control systems, therapy devices, electronic braille and reading systems, and robotic units for services such as retrieving various objects on command.

an extensible anti-theft system that is easily added to an automobile battery.

an anti-theft system which can be extended by adding application nodes in order to provide scalable anti-theft protection which can reduce theft-insurance costs.

a reliable network having various sensors and information-providing devices that assist the vehicle operator while driving or during an accident or other difficulty.

a multiple battery-based network with built-in, microcomputer battery management, including discharging and charging schedules, conducted through the automatic monitoring of battery voltage, current, and temperature, which maximizes the useful life of the battery system.

a stand-alone network and control system that can be purchased off the store shelf and implemented quickly, anywhere, anytime.

DRAWING FIGURES

The breadth of the secure personal applications network is reflected in the many possible embodiments which take their form in various parts and arrangements of parts. The following drawings are provided for the purpose of illustrating the many aspects and embodiments of the secure personal applications network and must not to be construed in any way as limiting. Generally, the negative-polarity electrical system elements are not shown in order to improve the drawings' clarity.

FIG. 4 is a plan view of a switched add-on exemplary embodiment that is attached to the top of a conventional lead-acid battery.

FIG. 5 is a front elevation of the switched add-on exemplary embodiment with battery system in FIG. 4.

FIG. 21 is a block diagram of an exemplary set of network-connected network nodes and devices, or separate circuits, to show the extensible character of the secure personal applications network.

PREFERRED AND EXEMPLARY ALTERNATE EMBODIMENTS

Figure 1:
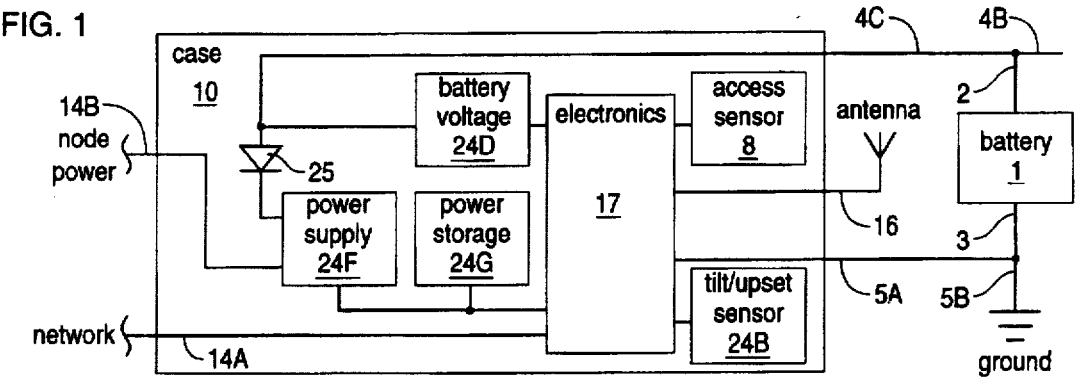
FIG. 1 is a diagram of the main components of the electrical system of a basic add-on exemplary base node or network circuits of the secure personal applications network.

With reference to FIGS. 1 through 21, digital electronic networks require at least one DC power source which may be derived from a rectified AC power source or from a battery. The battery itself may, in turn, be charged from such an AC power source, such as an automobile alternator, or a DC source, such as a photovoltaic solar panel. The secure personal applications network incorporates a digital network of application nodes, also referred to as separate circuits, having computer programs which monitor network integrity by programably causing the application nodes to enter a secure and safe state should the network medium or power source fail or should an unauthorized attempt to access the components occur. The term, separate circuits, refers herein to all circuits which have logical functions distinct from the base network node logical function, which is to provide basic network communication and security services. Because the physical base network node also includes separate circuits, which include circuits and, separately or together, multiple computer-program procedures and multitasking software which are functionally or logically distinct from the base network node and control their own application device or devices, including switches and sensors. Negative-polarity electrical elements are not shown in the drawings except where the inclusion of such drawing elements does not interfere with drawing clarity. Elements of one embodiment having like elements of a previous embodiment are designated sequentially by the same numeral and a single prime (') and by the same numeral and a double prime (") for the next like element in a subsequently described embodiment.

Figure 2:
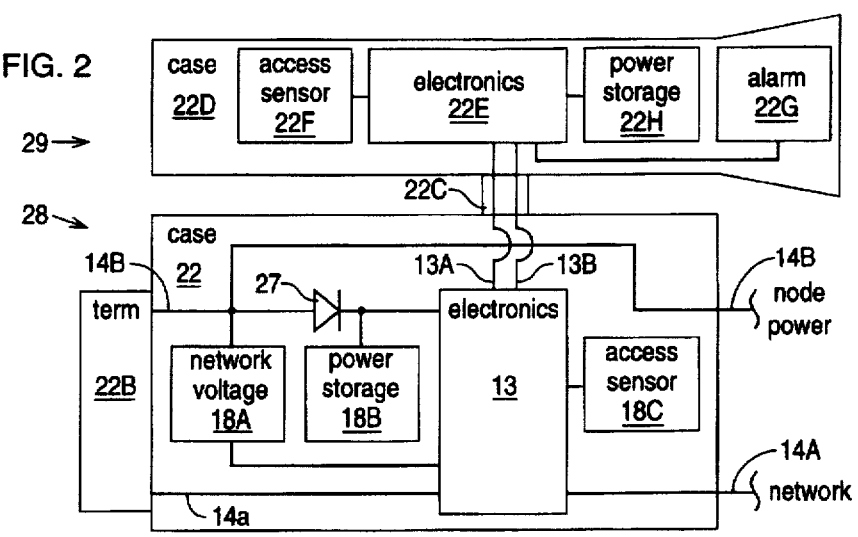
FIG. 2 is a diagram of the main components of the electrical system of an exemplary network application node or separate circuit.
Figure 3:
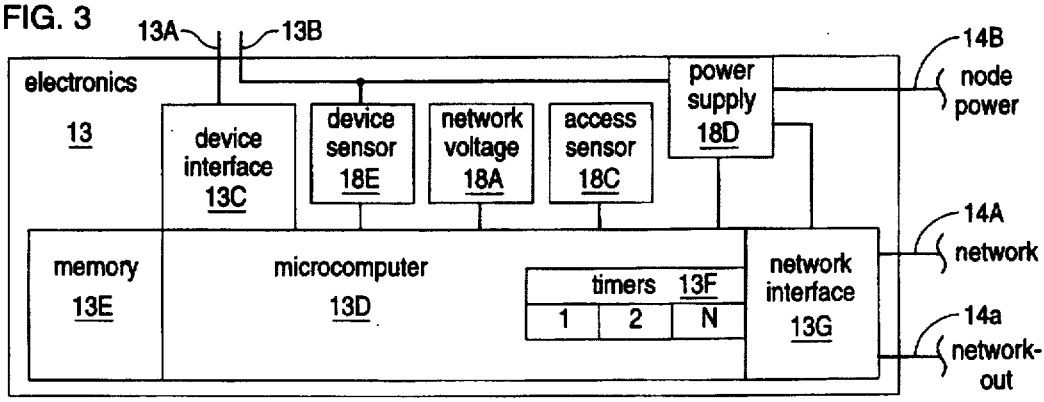
FIG. 3 is a diagram of the main components of the electronic system of an exemplary network node or separate circuit.

Description of Basic Add-on Exemplary Alternate Embodiment FIGS. 1 through 3

Figure 7:
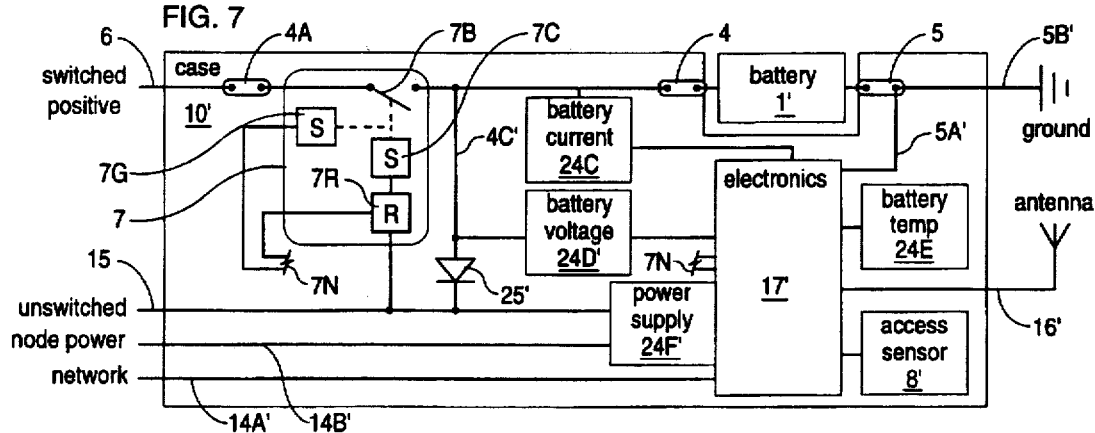
FIG. 7 is a diagram of the main components of the switched add-on base node or network circuits electrical system of the exemplary embodiment in FIGS. 4 through 6.
Figure 8:
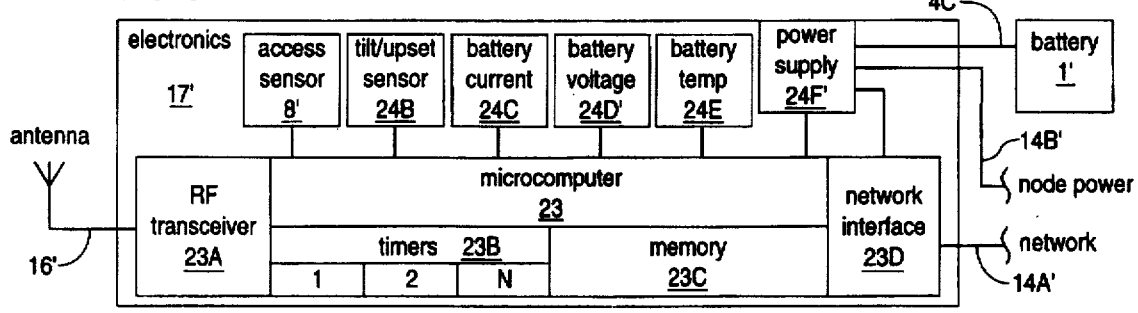
FIG. 8 is a diagram of the main components of the switched add-on base node or network circuits electronic system of the exemplary embodiment in FIGS. 4 through 6.

With reference to FIG. 1 which is a basic add-on secure personal applications network exemplary embodiment, the electronic circuitry 17, including program memory (not shown), which provides network functions is contained within a case 10 and is similar to the electronic circuitry of 17' in FIG. 8 with the exception of the battery current sensor 24C and the battery temperature sensor 24E in FIGS. 7 and 8. Installation of the aforementioned two sensor types may necessitate additional wires or a wireless implementation to remotely locate sensor types 24C and 24E directly on battery 1.

Continuing the reference to FIG. 1, a battery 1 is a conventional, nominally twelve-volt, wet lead-acid automobile battery and includes a positive electrode 2 which is operatively connected to a positive battery cable 4B and a network positive lead 4C; battery 1 is also connected to a negative electrode 3 which in turn is operatively connected to a negative battery ground cable 5B and a negative lead 5A. Electric power is supplied to case 10 and electronic circuitry 17 by way of positive lead 4C and negative lead 5A. Positive lead 4C is operatively connected to the power supply 24F by way of a diode 25 which restricts electric power loss from power supply 24F back to battery 1 or to ground in the event of failure of the battery or short circuiting of the network cable components. A battery voltage sensor 24D senses the voltage of battery 1 by way of its operative connection to positive lead 4C and, by way of electronic circuitry 17, from negative lead 5A which is not shown in order to improve clarity.

A power storage unit 24G in FIG. 1 stores power for an electronic circuitry 17 from power supply 24F and to a negative lead which connection is not shown for clarity. Power storage unit 24G supplies backup power to the network base node in the event of failure or severing through catastrophe, vandalism, or attempted disarming of battery 1, positive lead 4C, or negative lead 5A. Power storage units may include supercapacitors which are electric double-layer capacitors such as the NEC FS0H474Z (0.47 F). Supercapacitors require neither the periodic replacement nor the charging circuits required by batteries; also, because they don't employ a chemical reaction to provide electric power, supercapacitors can, without regulation, be charged and discharged an unlimited number of cycles and are, therefore, safe from leaking or exploding in normal use. All nodes and application devices in any secure personal applications network may similarly include power storage units, including supercapacitors, to temporarily compensate for the effects of loss of power. A network 14A is connected to electronic circuitry 17 and, together with a network node power supply 14B, combine as a powered-node network 14 (not shown) similar to that shown in FIG. 21. In applications including vehicles having a grounded frame, usually the negative pole is grounded, network node power supply 14B does not require an integral negative lead, although it is advisable to include a dedicated negative lead because corrosion can limit the effectiveness of vehicle frame-based grounds. An access sensor 8 detects the opening movement of case 10 which may presage loss of network integrity. An antenna 16 provides for operator control and programming using a computer device employing radio or other wireless medium of communication with the network base node of FIG. 1.

The exemplary alternate embodiment of FIG. 1 is operatively attached to the battery clamps of a conventional vehicle battery, positive lead 4C to the positive pole and negative lead 5A; case 10 is strapped securely in a suitable location. The programmable system consists primarily of one or more microcomputers or microcontrollers and memory (not shown), similar to the microcomputer 23 and a memory 23 in FIG. 8, located within electronics enclosure 17 which is programmed by way of antenna 16 through the use of a computer (not shown) such as a wireless computer 20 in FIG. 6 and a wireless computer 20' in FIG. 16. Said microcomputer functions both as the programmable master node of network 14A and as the separate device for performing functions including battery function calculations such as Peukert's equation and safety and network integrity functions as required by the condition of access sensor 8 and a tilt/upset sensor 24B. Network 14A can be extended with the addition of application nodes such as those shown in FIG. 2.

Referring now to FIG. 2 which is a diagram of an exemplary network application node which consists of a network node 28 and an application device 29. Network application node 28 includes a node case 22 and an application device 29 includes a case 22D which are connected by an application control lead 13A and application power lead 13B contained in an application cable 22C. Node case 22 includes a network node power lead 14B, to which is operatively connected a network voltage sensor 18A, which said power lead is operatively connected to the electronic circuits associated with an electronics enclosure 13 by way of a diode 27. A power storage unit 18B is operatively connected to network node power lead 14B to provide backup power in the event of failure of node power lead 14B and is electrically isolated from said node power lead by diode 27. Network lead 14A connects to electronic circuits associated with electronics enclosure 13 and a network lead out 14a, a portion of said network 14A, exits said electronic circuits where, along with the continuation of node power lead 14B, said network lead and said node power lead are, respectively, electronically and electrically terminated by terminator 22B. Termination of networks by devices similar to terminator 22B are required by some network types; if such termination is not required, terminator 22B may be a cover to prevent foreign matter from fouling the contacts. An access sensor 18C senses the opening of case 22, which, if unauthorized, may presage tampering and loss of network integrity. Said sensor 18C provides signals to electronic circuits in enclosure 13 which include programmable microcomputer capability to alter the operation of said node device in order to place the network system in a secure and safe condition as described in the description of FIG. 20. An application device 29 includes a case 22D, an alarm device 22G, a power storage unit 22H, and the electronic circuits 22E, including programmable microcomputer circuitry (not shown) to perform the application's alarm function and respond to network and network node commands, which operatively connect to alarm 22G. Alarm device 22G of application device 29 is normally controlled by network node 28.

Referring now to FIG. 3 which is a block diagram of the main electronic components of a network node or separate circuit associated with electronics enclosure 13. A microcomputer 13D is operatively connected to an application device interface 13C, a memory 13E, timers 13F, which contains individual timer units 1 through N for timing various software program procedures such as those in FIG. 20, and network interface 13G. Memory 13E includes non-volatile memory which contains network application device drivers and node setup information (not shown) to provide "plug and play" upon installation. Application device interface 13C provides interface logic through interface lead 13A for controlling application device 29 in FIG. 2. A power supply 18D supplies, through appropriate current limiting/isolation devices which are not shown, microcomputer 13D, an application device power lead 13B, which, in turn, supplies power to application device 29 in FIG. 2, and a network interface 13G. Network interface 13G provides network logic functions for network lead 14A which consists locally of portions of network lead 14A and network-out lead 14a. An application device power sensor 18E senses the electrical characteristics of application device power lead 13B to monitor the integrity of said lead for purposes of security. A network voltage sensor 18A senses voltage in network node power lead 14B for purposes of monitoring network integrity. Access sensor 18C senses opening of case 22 in FIG. 2 and provides the signal to microcomputer 13D which uses this signal to monitor network integrity.

Operation of the Basic Add-on Exemplary Alternate Embodiment FIGS. 1 through 3

After positive and negative leads 4C and 5A, respectively, of the network node in FIG. 1, are operatively connected to battery 1 and the network is initialized, the network application node of FIG. 2 is connected to node power 14B and network 14A. The basic add-on network is programmed using a wireless computer (not shown) similar to computer 20 in FIG. 6 which communicates to said network by way of antenna 16. The application node is programmed, in turn, by way of network 14A. The network base node and the network application node include security programs (not shown) similar to the security programs in FIGS. 19 and 20, respectively. During operation, the combined network and network application nodes, of which node 28 and its application device 29 are one network application node, provide a range of communicatively coordinated, services through programming and additional network application nodes which provide the network with extensible security, control, and monitoring functions.

The first level of security derives from the networked nature of all network application nodes which, through their intercommunication, automatically discriminate between different types of events and collectively respond to increasing degrees and types of challenge. For example, network application nodes in a home setting providing for sensing carbon monoxide (CO) gas, natural or cooking gas, smoke, glass breakage, and indoor/outdoor temperature sensing and control, along with appropriate alarms such as node 28 and application device 29 in FIG. 2, would discriminate between different conditions. In that example, rising indoor temperature on a warm Spring day would normally decrease heating system output and cause roof vents to open, however, the smoke and CO sensors detected gases, there may be a fire in the house itself. Alarms and alerting procedures would ensue, and roof vents would not be opened because doing so would increase the fire's burning rate. In the event the house temperature drops below its programmed level, the heating system would ordinarily increase heating system output. Should the glass-breakage sensor detect breaking glass in a room and alarms are initiated, however, the heating system would heat only enough to keep the room from freezing until alarms were reset, either locally or remotely through communications.

A second level of security is provided by application nodes dedicated to a specific function. For example, a networked video camera for building security surveillance may transmit its recorded images to a hidden receiver/recorder. At the third level of security, the network polls each node which is operatively connected to the network for a nodal response, including network node 28, in order to monitor the entire network's integrity, i.e., the network's communication carrying ability and each node's current operating parameters. In the event network integrity is partially or entirely lost, network and node security procedures are programmably implemented to optimize the security and safety of the controlled system or systems. The node, in this case an alarm, would initiate its function without receiving commands to initiate from other nodes by way of the network as it normally would. Security procedures are implemented similar to the security programs in the descriptions of FIGS. 19 and 20. Similarly, a fourth level of distributed security monitoring is maintained by node 28 monitoring its operative connection with application device 29, and with all other application devices to which the node is directly connected. Should such monitoring reveal problems, the aforementioned network and node security programs respond to place the network and nodes in programmably safe and secure conditions. For example, application device 29, an alarm siren, would initiate its alarm function without commands by network node 28 if either application interface lead 13A or power lead 13B in cable 22C were severed and, by detecting that severing, node 28 would alert the network.

Description of Switched Add-on Exemplary Alternate Embodiment FIGS. 4 through 8

The alternate exemplary embodiment of the secure personal applications network in FIGS. 4 and 5, plan view and side elevations, respectively, is an add-on secure personal applications network which is mounted to a conventional vented wet-lead-acid automobile battery. This add-on network includes a latching switch device 7, which latches in both the opened and closed positions and, in such positions, requires no sustaining electrical power. Latching switches similar to latching switch device 7 appear in all switched high-current-lead embodiments of the secure personal applications network. Latching switch device 7 functions to operatively connect or disconnect a conventional automobile battery 1' from battery cable 6 which, in turn, supplies loads including an vehicle engine starting solenoid and motor; battery cable 6 is an example of a high-current lead. Current transients associated with vehicle starting motors can induce disruptive currents in nearby electronic circuits. If the system's design can't accommodate expected induced currents, software procedures coupled with current sensing can neutralize the effect of comparatively infrequent current transients. Such procedures would cause network communication traffic to pause, after sensing indicates an appropriate transient, and resume when the transient's effects are no longer disruptive.

Referring now to plan-view FIG. 4 in which can be seen a cell-fill cap 1A on top of battery 1'. Shown edge-on with cover 10E partially cut away is system case 10', inside of which are the battery electrodes 2' and 3', positive and negative, respectively, and an intermediate post unit 2A to which a battery cable 6 is attached using a cable clamp 4A. Aforementioned latching switch device 7 includes components such as a stationary switch contact 7A, which is operatively connected to a clamp 4, a movable switch contact 7B which is self-adjustably attached to a shaft 7D and held adaptably parallel in contact position by a spring 7E which, in turn, is buttressed by a collar 7M which is rigidly affixed to shaft 7D.

The latching function of latching switch device 7 is performed by a latch solenoid 7G which, when energized, forces a right latch arm 7H and a left latch arm 7J to rotate relatively outward from a dual-grooved latch block 7F by the fulcrum effect of an anchored fulcrum pin 7L against the opposing force of a compression spring 7K. Electrical power is controlled by suitable time-delay relays, which are not shown in order to improve clarity, and distributed to solenoid components 7C and 7G of latching switch device 7 by way of an electrical lead 7N and its unnumbered distribution lead. The closing of latching switch device 7 causes the intimate contact of switch contacts 7A and 7B which operatively connects battery electrode 2' to battery cable 6 and its connected loads by way of latching switch clamp 4 to stationary latching switch contact 7A and movable latching switch contact 7B thence to battery cable 6 by way of, successively, switch conductor cables 6A and 6B, intermediate post unit 2A, and clamp 4A.

Battery negative electrode 3' is operatively connected to battery ground cable 5B' by way of post clamp 5. Positive and negative supplies to the electrical and electronics circuits are provided by positive lead 4C' and negative lead 5A'. Components of system case 10' include a case bottom 10B and a lower bottom 10C which support latching switch device 7 and intermediate post unit 2A, respectively; a case bottom opening 10D provides clearance for system case 10' to fit over battery electrode 3 and cable clamp 5 without their removal. Case cover 10E opens rotationally about a hinge 10F to cause an access sensor 8' to signal to the microprocessor-based control system (not shown) by way of sensor lead 8A that case cover 10E is being opened and to initiate additional control procedures to counter the effects of network-integrity loss due to unauthorized access or tampering. A network cable 14 provides network communication and node power to connected network nodes (not shown), also called separate circuits, in either the physical or logical network, or both, as shown in FIG. 21. An unswitched positive power lead 15 provides power to devices and accessories requiring low-current, uninterrupted power such as clocks and other units. An antenna 16' provides an interface for communicating with separate wireless devices, such as a handhold computer (not shown), for controlling, monitoring, and programming the secure personal applications network. System case 10' and its contents are affixed to battery 1' by a strap 11 which is secured by a screw assembly 11A.

Referring now to FIG. 5, a front elevation view of the exemplary alternate embodiment in FIG. 4, in which system case 10', shown partially cut away, supports hinged cover 10E, shown partially cut away to expose latching switch device 7, access sensor 8', negative battery clamp 5, negative battery cable 5B', positive switch clamp 4, clamp 4A, intermediate post unit 2A, positive battery cable 6, electronics enclosure 17', which contains the majority of electronic circuits and receives positive lead 4C', negative lead 5A', sensor lead 8A, and latching switch device lead 7N. Network 14, unswitched positive lead 15 with strain relief 15A, and antenna 16' exit said case. The energizing of solenoid 7C closes latching switch device 7 which, in turn, causes the intimate contact of switch contacts 7A and 7B which operatively connects battery electrode 2' to battery cable 6 and its connected loads by way of latching switch clamp 4 to stationary latching switch contact 7A and movable latching switch contact 7B thence to battery cable 6 by way of, successively, switch conductor cables 6A and 6B, intermediate post unit 2A, and clamp 4A. Shown also are case bottom 10B and case lower bottom 10C. Strap 11 affixes system case 10' to battery 1' and is adjusted using screw assembly 11A.

Figure 6:
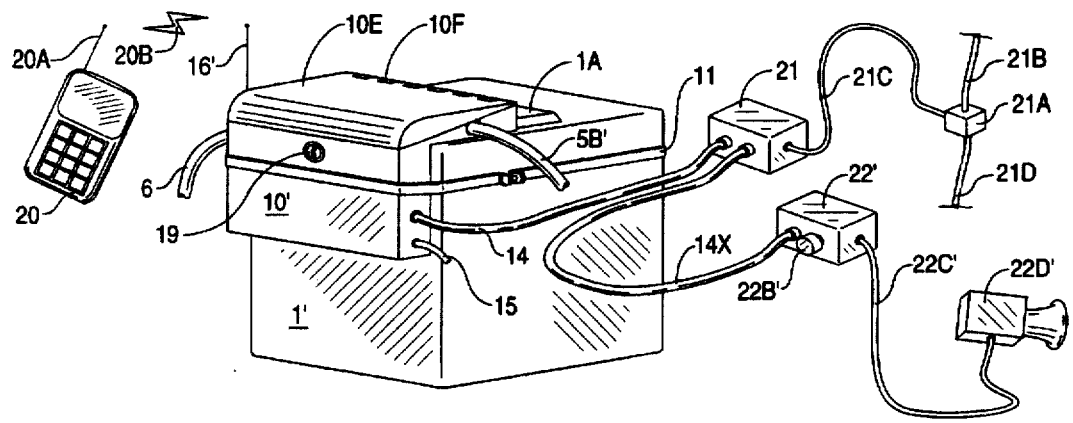
FIG. 6 is an isometric drawing of the switched add-on exemplary embodiment in FIGS. 4 and 5, including additional application nodes and a wireless computer.

Referring now to FIG. 6 in which can be seen the embodiment shown in FIGS. 4 and 5 and partially illustrates the extensibility of the secure personal applications network with the addition of application nodes; like reference numerals are used to denote like elements of FIG. 1 but are followed by a prime ('), as in FIGS. 4 and 5 above. System case 10' contains the base node or network logical circuits of a secure personal applications network, is affixed to battery 1' by strap 11, and includes lock assembly 19 which locks cover 10E closed in order to deter unauthorized access, vent cover 1A, hinge 10F, antenna 16', positive battery cable 6, negative battery cable 5B', unswitched positive cable 15, and network cable 14. Network cable 14 is operatively connected to a network node 21 which is similar to network node 28 in FIG. 2. Network node 21 is operatively connected to a second network node 22' by a cable extension 14X. Node 21 is operatively connected to an engine kill switch application device 21A by an application cable 21C. Engine kill switch application device 21A is a network-controlled switch device that interrupts the engine starting or ignition circuit, an ignition source circuit 21B and an ignition supply circuit 21D of a vehicle, for example, by preventing the unauthorized energizing of the starting solenoid (not shown). Engine kill switch application device 21A is programmably controlled by network node 21 which, in turn, is normally controlled as a network application node by the resulting programmed and operational state of the network application nodes by way of the base node or network logical circuits located in system case 10'.

An application device 22D' includes an alarm device which is operatively connected to application node 22' by an application cable 22C'. Network cable 14 is terminated by terminator 22B'. Application device 22D' provides programmable audible notification of attempted unauthorized entry into the vehicle in which the secure personal applications network is located. A hand-held wireless computer 20 communicates with the network base-node transceiver by way of a computer antenna 20A, a communication medium 20B, and an antenna 16'. Wireless computer 20 includes programmable microcomputer, wireless transceiver, memory, keyboard, and display to enable an operator to effectively program said network and network nodes and receive sufficient information from said network and network nodes or separate circuits to effectively maintain authorized operator control.

Referring now to FIG. 7 which shows an electrical block diagram of the embodiment shown in FIGS. 4 through 6 and which includes a battery 1', an antenna 16', and components in a system case 10'. The positive electrode of battery 1' is connected to positive battery clamp 4 and the negative electrode of battery 1' is connected to electronics negative supply 5A' and frame ground 5B' through negative battery clamp 5. Positive clamp 4 is connected to high-current battery cable 6 by way of latching switch device 7, which includes latching switch contact 7B, latching switch solenoid 7C, latching switch relay 7R, latch solenoid 7G, and leads 7N which are shown cut away for clarity, and second positive clamp 4A. Positive supply 4C" is connected to unswitched positive supply 15 and multiple power supply 24F' by way of diode 25' which prevents significant reverse current to battery 1' Power supply 24F' provides regulated and filtered positive power to electronic circuits in electronics enclosure 17' and to network application nodes, also called separate circuits herein, by way of node power lead 14B'. Electronic circuits, shown as a block diagram in FIG. 8, in electronics enclosure 17' receive sensing input from battery current sensor 24C, which senses current flow in positive lead near coupling 4, battery voltage sensor 24D' which senses voltage between diode 25' and positive clamp 4, battery temperature sensor 24E which is physically located in contact with battery 1', and access sensor 8' which senses the opening movement of cover 10E and implicit loss of network integrity. Said electronics circuits also provide the network functions of a network cable 14A'.

Figure 19:
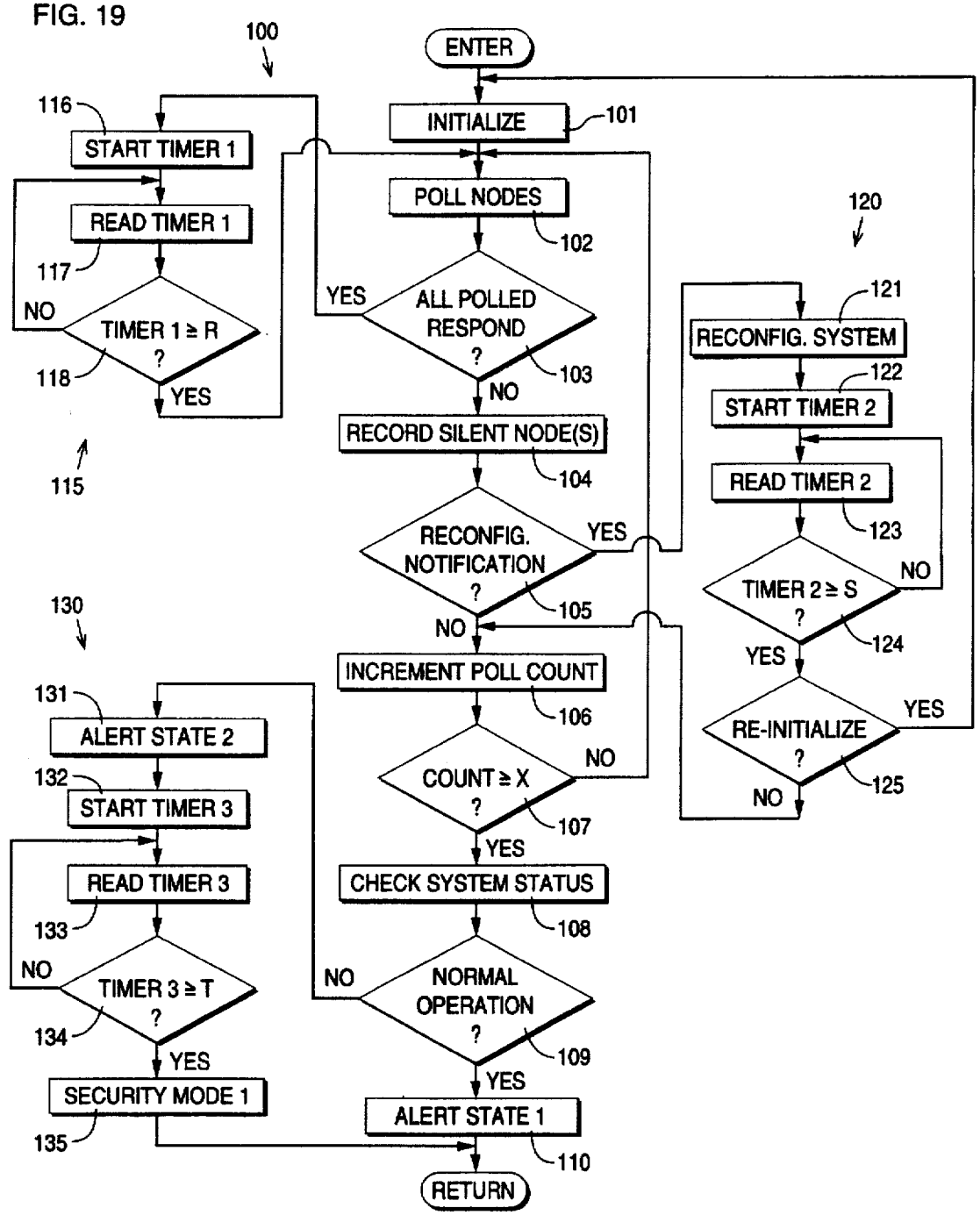
FIG. 19 is a flow diagram of the main components of the network circuits or base node security polling program of the preferred embodiment.
Figure 20:
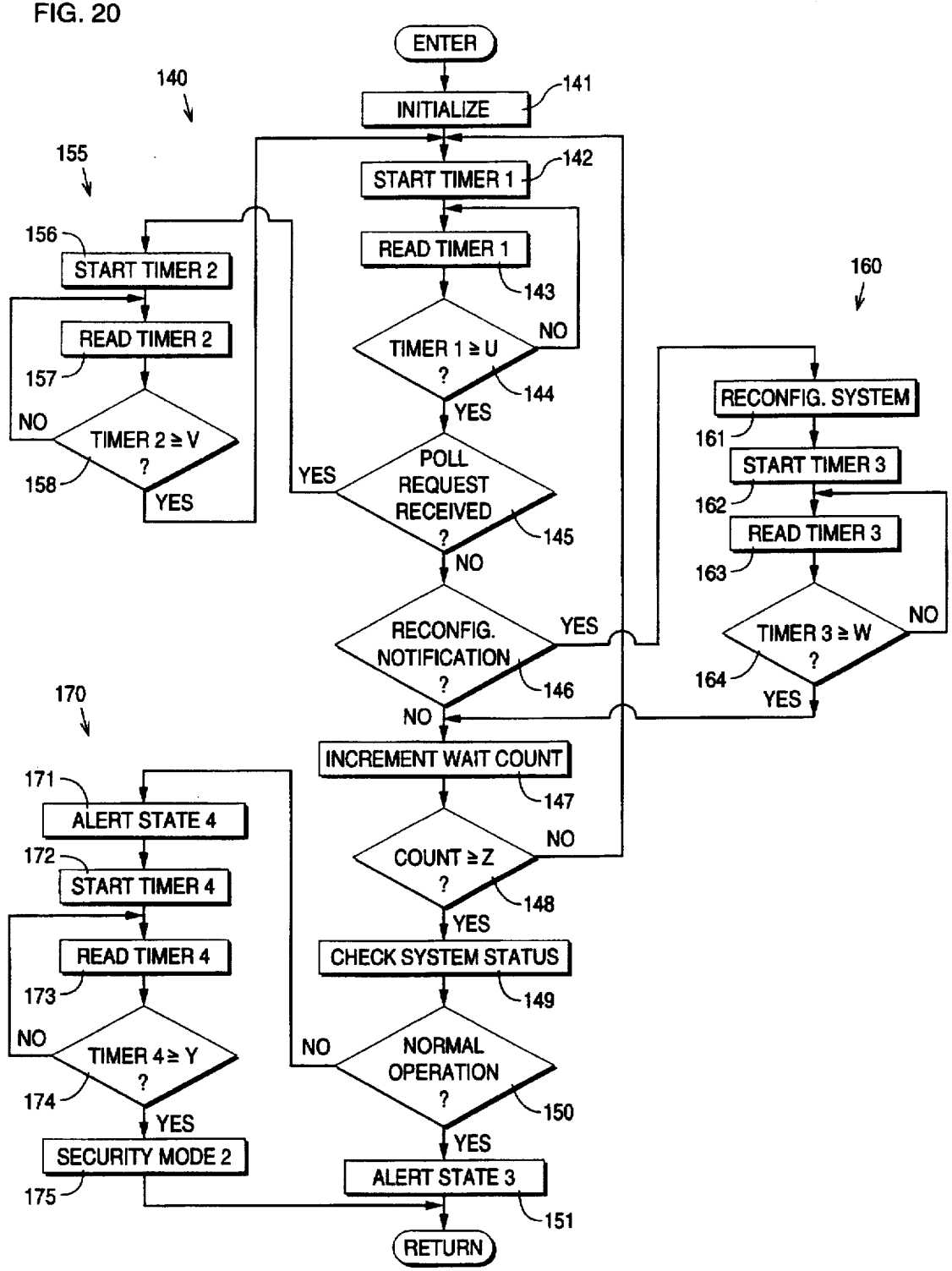
FIG. 20 is a flow diagram of the main components of the separate circuit or network node security polling control program of the preferred embodiment.

Referring now to FIG. 8 which is a block diagram of electronics enclosure 17' shown in FIG. 7 and its major associated components, in which can be seen battery 1', antenna 16' and electronics enclosure 17' which includes microcomputer 23 with an associated set of timers 23B, a memory 23C, a network interface 23D which, with microcomputer 23, serves as the base node, or network logical circuits, of network 14A' to which said interface is connected, and an RF transceiver 23A which is operatively connected to antenna 16' Timers 23B consists of timers 1, 2, and N which represent an appropriate number of timers to service software procedure such as those in FIGS. 19 and 20. Sensor connections to microcomputer 23 include access sensor 8', a tilt/upset sensor 24B, battery current 24C, battery voltage 24D', and battery temperature 24E. Power supply 24F are connected to battery 1' by positive lead 4C' and supplies electrical power to node power 14B', network interface 23D, and microcomputer 23. The circuits of power supply 24F and many sensors are located both within electronics enclosure 17' and throughout case 10'; the negative leads of said power supply are not shown for purposes of clarity.

Operation of Switched Add-on Exemplary Alternate Embodiment FIGS. 4 through 8

Battery voltage sensor 24D' provides a voltage signal to microcomputer 23 with which, as a digitized analog signal along with those of battery current sensor 24C and battery temperature sensor 24E, programably calculates, among other functions, remaining battery use and the charging regimen. That information is provided to the operator through wireless computer 20 in FIG. 6. Tilt/upset sensor 24B senses physical inclination of the system, as might occur should the vehicle be towed or transported, or through vehicle overturn, as might occur in an traffic accident, in which cases the microcomputer 23 would, upon receipt of the tilt/upset signal, initiate one or more programmed, network action requests which can be addressed to specific network nodes or to the entire network. Depending on the specific situation and types of network application nodes installed on the extensible network, said network action requests might include wireless telephone communications, using prerecorded messages to alert police, the owner, or emergency services, causing the broadcasting of a position-location signal from the vehicle in order to effect the vehicle's timely recovery, or simply causing one or more alarms in the vehicle to sound.

Access sensor 8' senses the opening of cover 10E, which may indicate loss of network integrity, and provides a signal to microcomputer 23 which then enters into a programmable security procedure to render the network secure against attempted tampering or circumvention. Similarly, microcomputer 23, through network interface 23D, timers 23B, and network cable 14A', programmably polls other nodes or separate circuits on said network for their responses in order to determine said nodes' current state, ability to communicate on an intact network medium, i.e., check for network integrity, or continued functioning. Should no response be detected from said nodes, microcomputer 23 processes procedures which programmably provide for optimum continued functioning of the system, increased safety, and increased security or security alertness. Among these and other functions, microcomputer 23, using timers 23B, also programmably calculates remaining battery charge, condition, and life using algorithms including Peukert's equation. Additionally, microcomputer 23 uses a portion of memory 23C for operator-programmable functions and maintenance of programmable system-access codes such as passwords and security algorithms.

Figure 9:
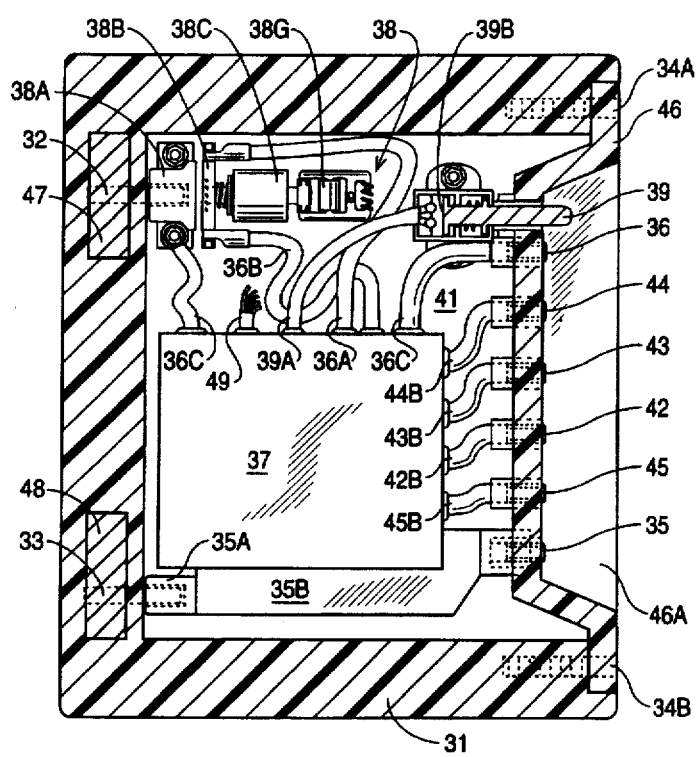
FIG. 9 is a section of a plan view of an internal chamber exemplary embodiment which has a base node or network logical circuits contained within a chamber within a battery.
Figure 10:
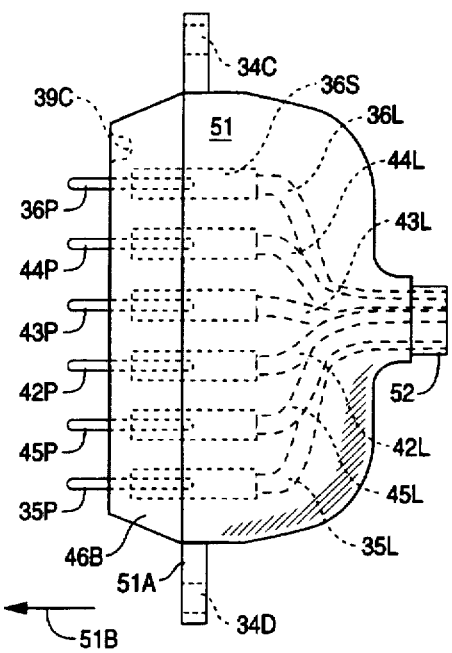
FIG. 10 is a plan view of an internal chamber exemplary embodiment having network and node-power leads incorporated in a plug which plugs into the chambered battery system in FIG. 9.
Figure 11:
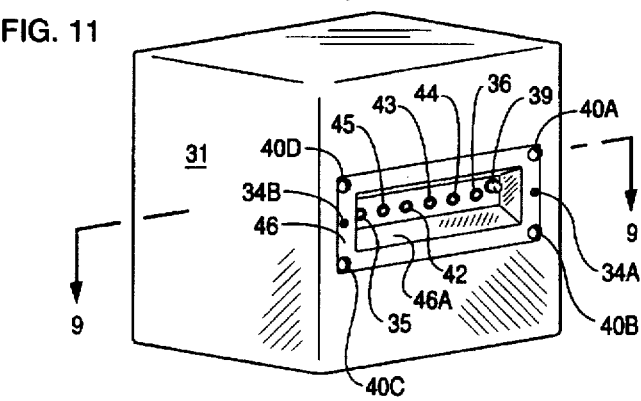
FIG. 11 is an isometric view of the internal chamber exemplary embodiment of the secure personal applications network in FIG. 9.

Description of Internal Chamber Exemplary Alternate Embodiment FIGS. 9 through 11

Referring now to FIG. 9 which shows a plan view in cross section of an alternate embodiment of the secure personal applications network in which a latching switching device 38 and network circuitry, enclosed within an electronics enclosure 37, are located within the primary power supply, a power source 31. Power source 31 includes one or more capacitance-type electric power storage devices and would be installed in a system which has a dependably constant power supply. A positive bus bar 47 and a negative bus bar 48 contain the male high-amperage electrical connectors 32 and 33, respectively, which serve to electrically connect the electrical and electronic components, circuits, and devices to power source 31. Said bus bars 47 and 48 are sufficiently large to provide structural support for male high-amperage electrical connectors 32 and 33, respectively, and to remove heat generated through connectors 32 and 33 which can occur through sustained high-amperage operation. Current transients associated with high-amperage operation can induce disruptive currents in nearby electronic circuits. If the system's design can't accommodate expected induced currents, software procedures coupled with current sensing can neutralize the effect of comparatively infrequent current transients. Such procedures would cause network communication traffic to pause, after sensing indicates an appropriate transient, and resume when the transient's effects are no longer disruptive.

Male high-amperage electrical couplings 32 and 33 are operatively connected to female high-amperage electrical couplings 38A and 35A, respectively. High-amperage electrical connectors suitable to serve as female high-amperage electrical connectors 38A and 35A and male high-amperage electrical connectors 32 and 33 include RADSOK (registered trademark) High Amperage Electrical Connectors available from Konnektech Division of K & K Stamping Company, 1200 West Eleven Mile Road, Royal Oak, Mich. 48067, U.S.A., telephone (810) 547-0141; these connectors are available in sizes from 4 mm to 40 mm and in various configurations with capacities ranging from 10 amps to greater than 2000 amps, with the 10 mm version showing a temperature rise of about 100° C. in 5 minutes at 340 amps sustained current or 4080 watts at 12 volts, over three times that expected in normal vehicle starting loads.

Also shown in FIG. 9 is a rigid negative lead 35B which operatively connects female high-amperage electrical connector 35A to external female plug receptacle 35; said rigid negative lead is also operatively connected to the electronics enclosure 37 to provide a negative source or ground to the electrical and electronic components associated therewith. Latching switch device 38 is similar to latching switch device 7 of FIGS. 4, 5, and 7, and includes the stationary contact 38A, the movable contact 38B, and the solenoid 38C. Movable contact 38B is operatively connected to female plug connector 36 by paired latching switch leads 36A and 36B, voltage regulation circuitry (not shown) in electronics enclosure 37, and switched power lead 36C. Voltage regulation circuitry may be provided for both outgoing and incoming power, allows the capacitance-type power source to be operated at higher voltages in order to partially compensate for the power source's lower power-storage capability. Electrical and electronic components associated with electronics enclosure 37 connect to their associated components and include the unswitched power lead 36C which provides unswitched positive power to the components, including the latching switch relay which is not shown within electronics enclosure 37, and to female plug receptacle 44 through lead 44B. The leads of wire bundle 49 provide control and electrical power to latching switch device 38 electrical components, including the switch solenoid 38C and latching solenoid 38G. The network leads 43B, 42B, and 45B provide network connection to network components within electronic enclosure 37 and network receptacles 43, 42, and 45, respectively. Network receptacles 43, 42, and 45 provide the requisite number of wires for a simple two-wire plus common network and may be varied according to the implementation's requirements. Latching switch device 38 and access sensor 39 are attached to chamber housing floor 41.

Referring yet to FIG. 9 in which can be seen access sensor 39 which is similar in function to access sensor 8 in FIG. 1 and access sensor 8' in FIGS. 4, 5, and 7. Access sensor paired leads 39A provide the sensor signal from access sensor 39 which is normally depressed relatively inwardly by the insertion of a plug 51 of FIG. 10 which causes sustained contact between access-sensor switch element 39B and the paired contacts of access-sensor paired leads 39A to provide a normally closed access-sensor switch 39B. Should access sensor switch 39B be opened, as would occur if plug 51 of FIG. 10 were removed, the electronic circuits (not shown), which are similar to those of FIG. 8 and are located within electronics enclosure 37, would interpret the switch opening as a loss of network integrity and programmably cause the microcomputer circuits to process security procedures similar to those of microcomputer 23 in response to a signal from access sensor 8', as shown in FIG. 8, after sensing the opening of cover 10E in FIG. 6. A receptacle panel 46, including the receptacle recess 46A, is mechanically fastened or bonded to power source 31, supports the end of access sensor 39 and plug receptacles 36, 44, 43, 42, 45, and 35, and provides a pair of threaded bosses 34A and 34B for threaded fasteners, which are not shown, to be inserted through holes 34C and 34D in a mounting flange 51A in FIG. 10 to threadedly secure said plug in place after it is moved in the direction of the direction arrow 51B and engaged in said receptacle panel 46.

FIG. 10 shows a network and system cable 52 terminated on one end by extension plug 51 which has bevelled leading surfaces 46B to complementarily match the bevel of receptacle recess 46A, with a dimple 39C which provides clearance for the tip of access sensor 39, and mounting flange 51A with fastener clearance holes 34C and 34D. Electrical portions of plug 51 include connector pins 36P, 44P, 43P, 42P, 45P, and 35P, which, respectively, plug into receptacles 36, 44, 43, 42, 45, and 35 in FIG. 9. Said pins are typically fitted within sockets such as the socket 36S located within plug 51 and further serve to secure wire leads of the network and power supply, namely leads 36L, 44L, 43L, 42L, 45L, and 35L.

Referring now to FIG. 11 which is an isometric view of the alternate embodiment shown in FIG. 9 and cross section arrows 9 which indicate the section location and viewing direction of FIG. 9; plug 51 of FIG. 10 is not shown in order to improve clarity. Receptacle panel 46, including receptacle recess 46A and fastener clearance holes 34C and 34D, is attached to power source 31, fixed in place with fasteners 40A, 40B, 40C, and 40D, and provides openings and support for plug receptacles 36, 44, 43, 42, 45, and 35, and access sensor 39. Threaded fasteners (not shown) are used to mechanically attach plug 51 of FIG. 10 by inserting said fasteners through clearance holes 34C and 34D in flange 51A and securing them in threaded bosses 34A and 34B.

Operation of Internal Chamber Exemplary Alternate Embodiment FIGS. 9 through 11

The alternate embodiment of the secure personal applications network shown in FIGS. 9 through 11 includes one or more charged capacitors in power source 31 which is supplied by a normally available power supply. The network is operated by inserting plug 51 into receptacle recess 46A to operatively connect electrical and network lines of network and system cable 52 and depress access sensor 39 to close access sensor switch 39B, which provides a signal for monitoring network integrity. Electronic circuits (not shown), which are similar to those in FIG. 8, are located substantially within electronics enclosure 37 and include voltage regulation and rectification through the use of a bi-directional power supply and conditioning unit suited to the higher and variable voltages expected from the capacitance-based power source 31. Said cable 52 is similar to network cable 14 of FIG. 21 and FIGS. 4 through 6 with the main difference being the inclusion of the high-current switched positive line and negative ground line to network and system cable 52. Operator programming and control is accomplished through the use of a separate computer which can be of the wireless type and which communicates by way of a wireless node (not shown) attached to network and system cable 52 or it may be physically connected to an appropriate node attached to said cable 52.

Description of Preferred Embodiment FIGS. 12 through 21

Figure 12:
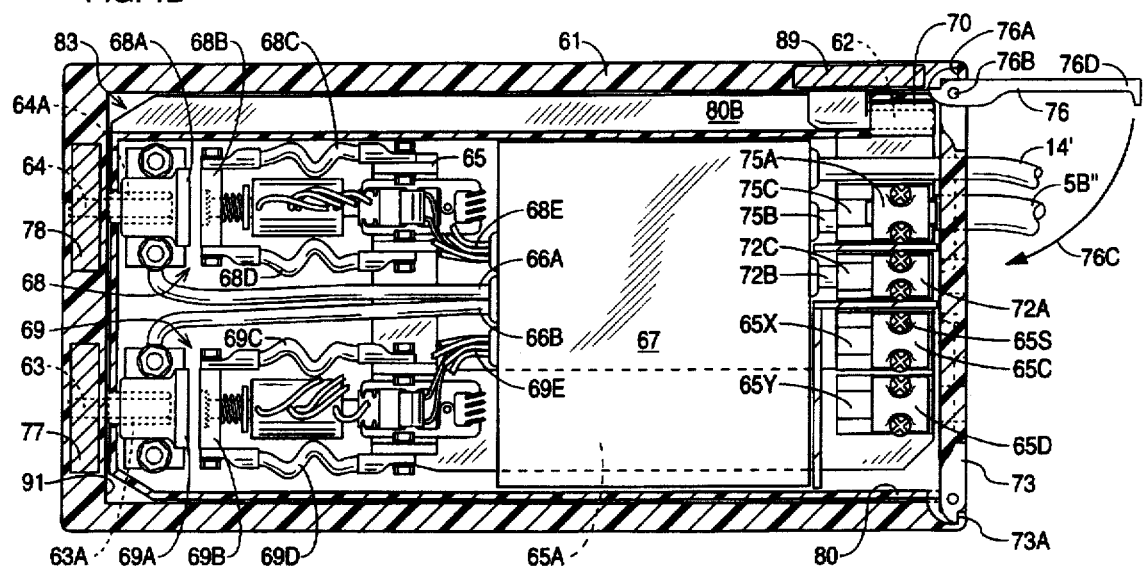
FIG. 12 is a section of a side-elevation view of the preferred embodiment contained within a cassette contained within a multiple-battery bank.

Referring now to FIG. 12 which shows a side elevation cross-section of the preferred embodiment of the secure personal applications network in which like reference numerals are used to denote like elements of FIGS. 4 through 8 but are followed by a single prime (') or double primes ("), depending on the number of preceding iterations of the same component type. FIG. 12 shows a battery bank 61, which includes one or more sealed battery types such a nickel-cadmium (NiCad) or high-amperage-capacity, sealed-type batteries. Such sealed-type batteries may be horizontal-plate, woven filament, lead-acid Horizon (registered trademark) batteries manufactured by Electrosource Inc., 3800 B Drossett Drive, Austin, Tex. 78744-1131, telephone (512) 445-6606 or other appropriate types of batteries. Battery bank 61 includes a cassette 80 and an electronics enclosure 67 within said cassette, a pair of positive battery bars 77 and 78, and, respectively, a pair of male high amperage connector couplings 63 and 64 fastened to said battery bars. A male high-amperage connector coupling 62 is fastened to a negative battery bar 89. Internal features of battery bank 61 include an internal chamber 91 into which cassette 80 insertably and withdrawably fits and an upper closure groove 76A and a lower closure groove 73A which provide gripping features for physically securing cassette 80 in place within chamber 91 by a pair of closure securing handles 76 and 73.

Continuing to refer to FIG. 12, cassette 80 includes a connector groove 83, which includes a connector groove outer wall 80B, which provides clearance for said cassette to slide past a negative male high-amperage electrical connector 62 when said cassette is slidably inserted or removed from chamber 91 in battery bank 61. Included in cassette 80 are upper and lower latching switch devices 68 and 69, respectively, which are similar to latching switch devices 7 and 38 of FIGS. 4 and 9, respectively. Latching switch devices 68 and 69, respectively, include the stationary latching switch contacts 68A and 69A which contain female high-amperage connector couplings 64A and 63A, the movable latching switch contacts 68B and 69B, and the solenoid power and control leads 68E and 69E. Latching switch device 68 closes to connect positive electrical power from positive battery bar 78, which is connected to a battery 61B shown in FIG. 14 and located in battery bank 61, to the positive terminal blocks 65X and 65Y, by way of male high-amperage electrical connector 64, female high-amperage electrical connector 64A, a stationary latching switch contact 68A, a movable latching switch contact 68B, the paired latching switch leads 68C and 68D, a switched positive bus 65, and a switched interconnect bus 65A. Similarly, latching switch device 69 closes to connect positive electrical power from positive battery bar 77, which is connected to a battery 61A located in battery bank 61 and shown in FIG. 14, to the positive terminal blocks 65X and 65Y, by way of a male high-amperage electrical connector 63, a female high-amperage electrical connector 63A, a stationary latching switch contact 69A, a movable latching switch contact 69B, paired latching switch leads 69C and 69D which are connected to a switched positive bus 65, in addition to aforementioned paired latching switch leads 68C and 68D, and switched interconnect bus 65A. A negative terminal block 75C is operatively connected to a negative battery bar 89 by a male high-amperage electrical connector 62, and a female high-amperage electrical connector 70 and provides for attachment of the negative cable 5B" by way of a negative terminal block clamp 75A; negative terminal block 75C provides operative connection to negative or ground for the electronic components in electronic enclosure 67 through a cable 75B.

Electrical connectors suitable to serve as female high-amperage electrical connectors 64A, 63A, and 70 and male high-amperage electrical connectors 64, 63, and 62, include RADSOK (registered trademark) High Amperage Electrical Connectors available from Konnektech Division of K & K Stamping Company, 1200 West Eleven Mile Road, Royal Oak, Mich. 48067, U.S.A. , telephone (810) 547-0141. These connectors are available in sizes from 4 mm to 40 mm in various configurations and with capacities ranging from 10 amps to greater than 2000 amps, with the 10 mm version showing a temperature rise of about 10° C. in 5 minutes at 340 amps sustained current. Battery bars 77, 78, and 89 are as large as necessary to sink any heat generated through male connectors 63, 64, and 62 and female connectors 63A, 64A, and 70, respectively, during sustained high amperage operation. Current transients associated with high-amperage operation can induce disruptive currents in nearby electronic circuits. If the system's design can't accommodate expected induced currents, software procedures coupled with current sensing can neutralize the effect of comparatively infrequent current transients. Such procedures would cause network communication traffic to pause, after sensing indicates an appropriate transient, and resume when the transient's effects are no longer disruptive.

Continuing to refer to FIG. 12, the unswitched positive leads 66A and 66B provide positive electrical power to the electrical and electronic circuits of cassette 80 including those within electronics enclosure 67. A switched terminal block 65X includes a switched terminal block clamp 65C which is fastened, typically, in two places by fasteners such as a screw 65S; a second switched positive terminal block 65Y similarly provides for cable attachment with a terminal block clamp 65D. In a similar fashion, an unswitched positive terminal block 72C provides for cable attachment by an unswitched terminal block clamp 72A, said block 72C is supplied unswitched positive power through a cable 72B which extends from electronics enclosure 67. A network cable 14' originates in electronics enclosure 67 and extends outside cassette 80 for connection to additional network nodes. Cassette 80 includes the upper and lower closure securing handles 76 and 73, respectively, in which said handle 73 is shown in its closed position which has engaged closure groove 73A in battery bank 61. Upper closure securing handle 76 is shown in the unengaged or open position. In closing, said handle 76 rotates around a hinge pin 76B, with the motion of the lower handle portion 76D describing an arc 76C as it closes, while the opposite-most portion engages closure groove 76A to secure cassette 80 within chamber 91.

Figure 13:
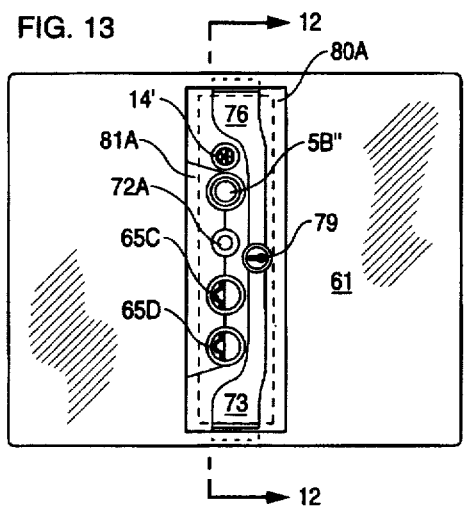
FIG. 13 is an end-elevation view of the preferred embodiment with the cassette system in FIG. 12.

Referring now to FIG. 13 which is a front elevation of battery bank 61 with cassette 80 inserted and upper and lower closure securing handles 76 and 73 shown closed and locked in place through the agency of a removable key lock 79. The arrows 12 indicate the location and viewing direction of the cross section view shown in FIG. 12. Shown also are the cassette end panel 80A, a cassette cover end panel 81A, end views of network cable 14', negative cable 5B", unswitched positive terminal block clamp 72A, and switched positive terminal block clamps 65C and 65D.

Figure 14:
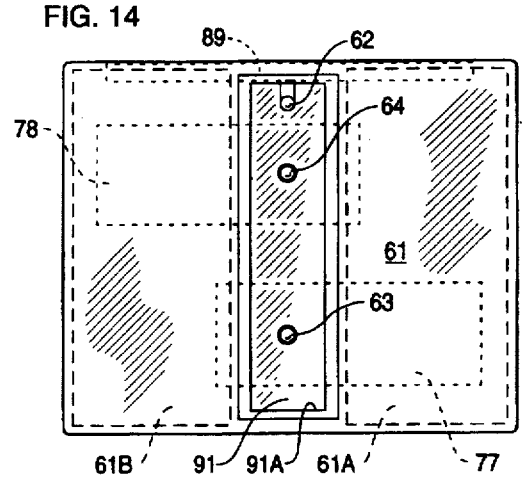
FIG. 14 is an end-elevation view of the multiple battery, without the network and cassette, of the preferred embodiment shown in FIGS. 12 and 13.

Referring now to FIG. 14 which is a front elevation of battery bank 61 and chamber 91 which is shown with the cassette withdrawn. Shown are male high-amperage electrical connector 62, upper and lower male high-amperage electrical connectors 64 and 63, respectively, and chamber opening 91A. Shown in phantom lines are batteries 61A and 61B, negative battery bar 89, and upper and lower positive battery bars 77 and 78, respectively. The positive poles or pole elements of batteries 61A and 61B are connected to positive battery bars 77 and 78, respectively, which are of sufficient size to function as heat sinks for high-amperage applications, as mentioned above, and to provide structural supports for male high-amperage electrical connectors 63 and 64, respectively. Negative poles or pole elements of batteries 61A and 61B are similarly connected to negative battery bar 89 which is of sufficient size to function as a heat sink, as mentioned above, and to provide structural support for male high-amperage electrical connector 62.

Figure 15:
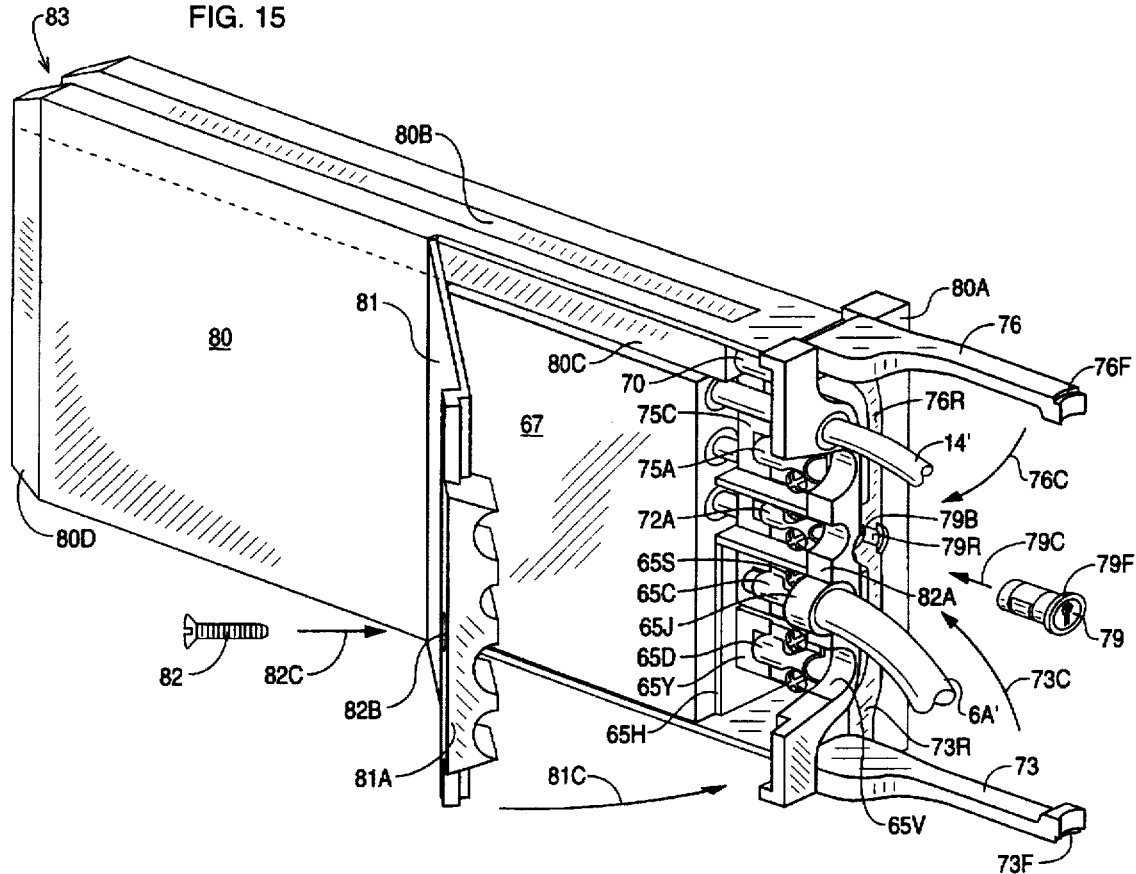
FIG. 15 is an isometric view of the cassette portion of the preferred embodiment shown, with the cassette door in the open position, in FIGS. 12 and 13.

Referring now to FIG. 15 which is an isometric drawing of cassette 80 including a connector groove 83, which includes connector groove outer, inner walls, and chamfer, 80B, 80C, and 80D, respectively, and an access door 81, which is shown open to reveal electronics enclosure 67 and terminal blocks, and is closed in the direction of arrow 81C. At the termination of connector groove 83 is female high-amperage electrical connector 70, which is operatively connected to negative terminal block 75C to which terminal block clamp 75A is adjustably affixed, which is adjacent to network cable 14'. Successively adjacent to said clamp 75A is unswitched positive terminal block clamp 72A, screw 65S, switched positive terminal block clamp 65C, a cable weather seal 65J which is shown in place around switched positive cable 6A' and may be included on all mating surfaces of cover flange 81A and cassette end panel 80A to seal against moisture and foreign material, switched positive terminal block 65Y, terminal block clamp 65D, an electrical insulator 65H, and a cassette end-panel conduit channel 65V. Components of cassette end panel 80A include, respectively, upper and lower closure securing handles 76 and 73, flange grooves 76F and 73F, handle recesses 76R and 73R, and closing direction arrows 76C and 73C which show the direction of handle travel when handles are being closed. Centrally associated with the end panel is removable lock 79 and its flange 79F, lock recess 79R, access switch button 79B, and lock insert arrow 79C, which indicates the direction of travel for inserting the removable lock. After cassette access door 81 is closed it is secured with screw 82 which is inserted along the direction of arrow 82C through cover end panel clearance hole 82B and is screwed into threaded boss 82A in cassette end panel 80A.

Figure 16:
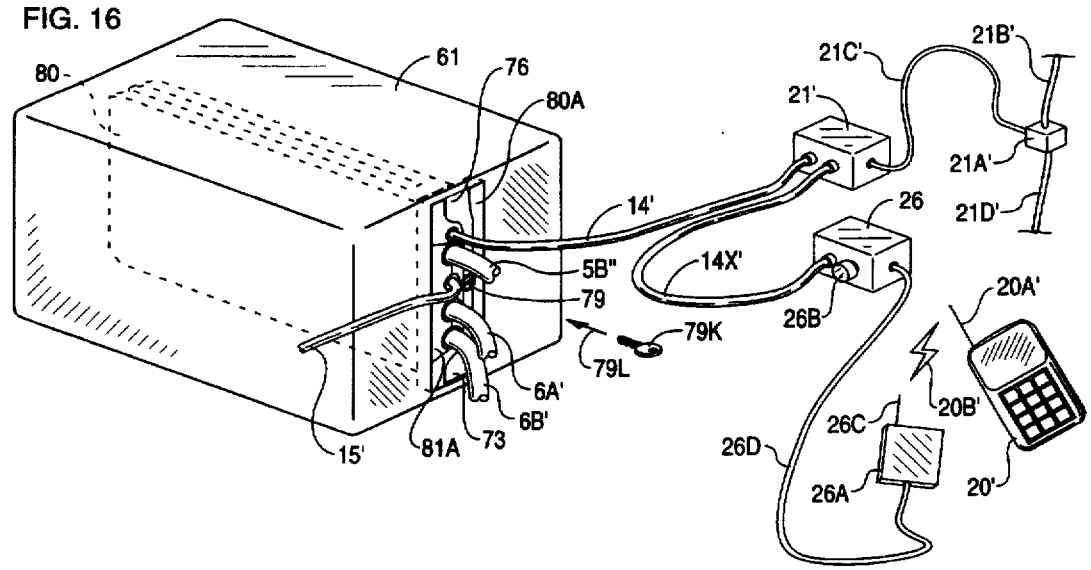
FIG. 16 is an isometric view of the preferred embodiment with the cassette system and the multiple battery shown in FIGS. 12 through 15.

Referring now to FIG. 16 in which can be seen the major components of the preferred embodiment of the secure personal applications network in exemplary, partial, extension with added application nodes including battery bank 61 substantially containing cassette 80, said cassette shown in phantom lines, cassette end panel 80A, cassette cover end panel 81A, securing handles 76 and 73 and key lock 79 in secured positions, and key 79K which can be introduced into said key lock along the path indicated by the direction arrow 79L. Extending from said cassette are switched positive cables 6B' and 6A', unswitched positive cable 15', negative cable 5B" and network cable 14'. Network cable 14' is operatively connected to an application node 21' which, through connection with an application connection lead 21C', provides network interfacing and control for an engine kill switch application device 21A' which controllably switches an ignition source lead 21B' to operatively connect to an ignition supply lead 21D' and operatively disconnect said lead 21B' from said lead 21D' and prevent the starting of a vehicle engine (not shown) thereby. Application node 21' is operatively connected to network extension cable 14X' which provides network functions, including communication functions and node power, to application nodes distally connected to said network, including a network application node 26. Further expansion of the network is made by way of attaching the expansion node to the connector behind terminator 26B. Application node 26 provides network interfacing and control for a wireless transceiver application 26A through an application connection lead 26D; said wireless transceiver 26A communicates, through the agency of an antenna 26C, with a wireless computer 20' through communications medium 20B' and computer antenna 20A'. Wireless computer 20' includes programmable microcomputer, wireless transceiver, memory, keyboard, and display to enable an operator to effectively program said network and network nodes and receive sufficient information from said network and network nodes or separate circuits to effectively maintain operator control.

Figure 17:
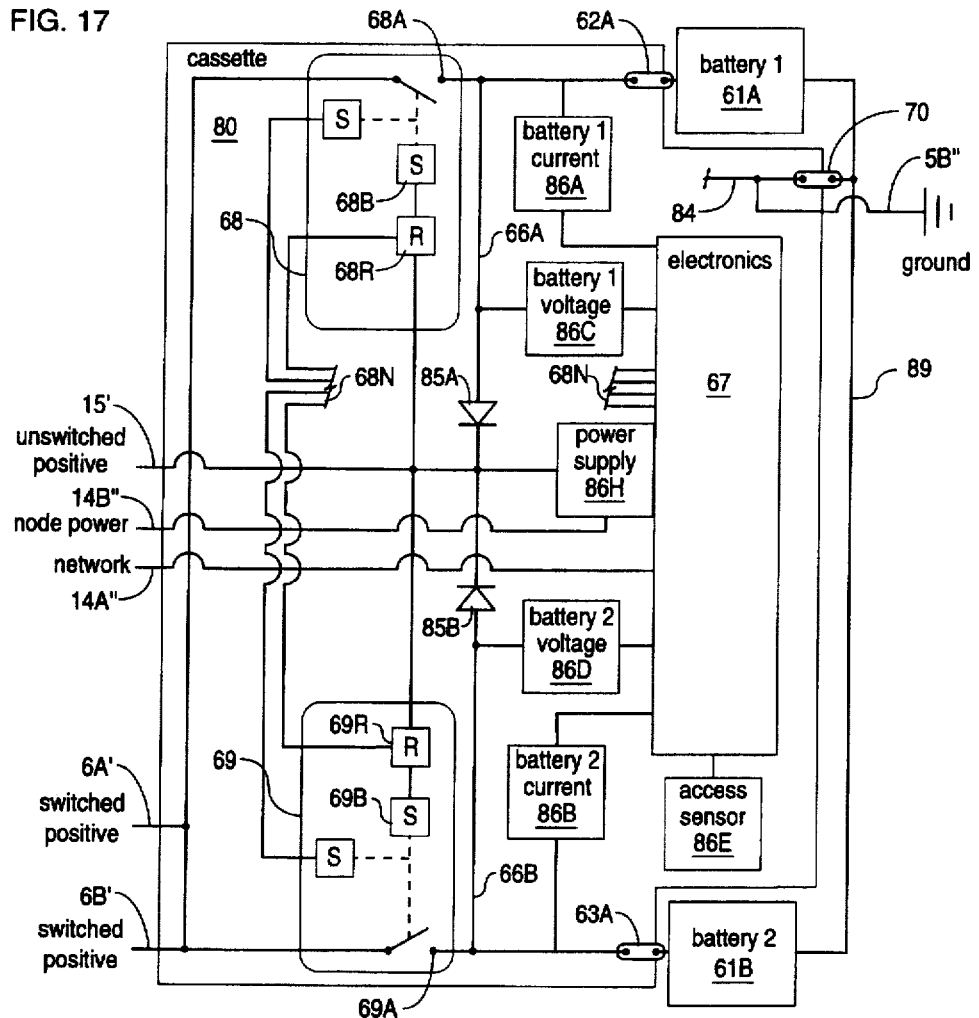
FIG. 17 is a block diagram of the main components of the network circuits or base node electrical system of the preferred embodiment shown in FIGS. 12 through 16.

Referring now to FIG. 17 which is a block diagram of the network base node main electrical components of the preferred embodiment of the secure personal applications network in FIGS. 12 through 16 and includes batteries 61A and 61B, cassette 80, electronics enclosure 67 within said cassette, and negative or ground cable 5B". The negative poles of said batteries are interconnected by negative battery bar 89 which, in turn, is operatively connected to female high-amperage electrical connector 70. Said connector 70 is operatively connected to negative battery cable 5B", which is connected to the system ground, and negative lead 84, which connects to appropriate parts of the system's electrical and electronic circuits; negative-polarity leads other than those recited are not shown in order to maintain graphical clarity. The positive poles of batteries 61A and 61B are operatively connected to switched positive cable 6A' and 6B' by female high-amperage electrical connectors 62A and 63A and latching switches 68 and 69, respectively. Said latching switches include, respectively, stationary contacts 68A and 69A, latching relays 68R and 69R, solenoids 68B and 69B and, controlled by control leads 68N, operate similarly to latching switch 7 of FIG. 7. Positive leads 66A and 66B are, respectively, connected to stationary latching switch contacts 68A and 69A and diodes 85A and 85B which provide unswitched positive-polarity power to power supply 86H, latching switches 68 and 69, and unswitched positive supply 15' for use in powering any low-current loads requiring a constant power supply.

Referring yet to FIG. 17, sensors, which are physically located in appropriate locations of cassette 80 and not necessarily depicted within electronics enclosure 67, include battery current sensors 86A and 86B which sense battery current flow in the areas of female high-amperage electrical connectors 62A and 63A, respectively; battery voltage sensors 86C and 86D which, respectively, sense the voltages of batteries 61A and 61B from leads 66A and 66B. An access sensor 86E senses the opening of access switch button 79B which is caused by the removal of key lock 79 in FIG. 15. A power supply 86H supplies regulated positive power to network node power lead 14B" and electronic circuits in electronics enclosure 67, including network logical circuits which control network cable 14A".

Figure 18:
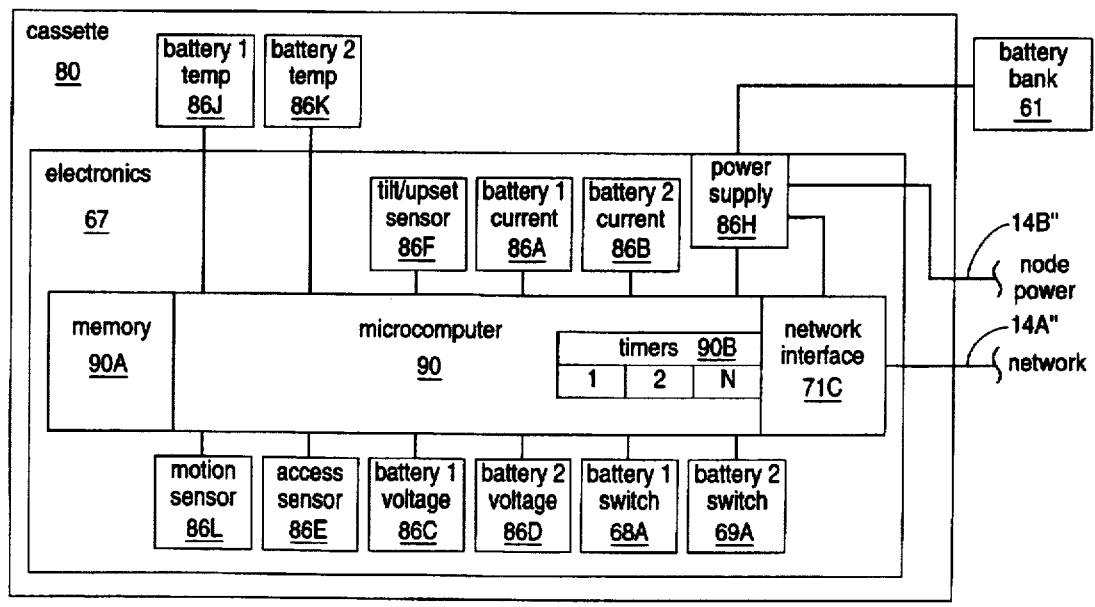
FIG. 18 is a block diagram of the main components of the network circuits or base node electronic system of the preferred embodiment shown in FIGS. 12 through 17.

Referring now to FIG. 18 which is a block diagram of the base node or network logical circuits main electronic components of the preferred embodiment of the secure personal applications network in which can be seen cassette 80, battery bank 61, and electronics enclosure 67. Battery bank 61 provides electric power to power supply 86H which, in turn, supplies regulated power to loads including the node power lead 14B", a network interface 71C, and microcomputer 90. Microcomputer 90 receives sensory input from a pair of battery current sensors 86A and 86B, battery voltage sensors 86C and 86D, and battery temperature sensors 86J and 86K which, respectively, sense current, voltages, and temperatures of each of the two batteries in battery bank 61 and provide the data to microcomputer 90. A tilt/upset sensor 86F, access sensor 86E, and a motion sensor 86L, which may be an accelerometer, provide their respective sensory signals to microcomputer 90 for further processing and control functions which are outlined below. Latching switches 68A and 69A are controlled by microcomputer circuit 90. Memory 90A includes long-term and working computer memory which, with timers 90B, are used by microcomputer 90 for processing computer programs and algorithms such as those in FIG. 19. Network interface 71C provides control functions for network 14A" and node functions for the network logical circuits or base node.

Operation of Preferred Embodiment FIGS. 12 through 18

Assembling the cassette, as shown withdrawn and with the cassette door 81 open in FIG. 15, begins with connecting the cables. Cables including cable 6A' are connected to appropriate cassette terminal blocks by placing each of the cables, with appropriate weather seals such as cable weather seal 65J, in open conduit channels like end panel conduit channel 65V, and with conductors tightened in place by terminal block clamps 65C, 65D, 72A, and 75A. The cables themselves are radially secured in place by closing hinged cassette door 81 along the path of closing direction arrow 81C and fastening it in place. Cassette cover end panel 81A is secured in place by screw 82 which is introduced along the path of direction arrow 82C through clearance hole 82C in hinged cassette door 81 and threaded into threaded boss 82A in the side of cassette end panel 80A. Tightening the screw causes cassette cover end panel 81A to compress the weather seals and, indirectly, the cables, snugly into conduit channels such as 65V.

Referring yet to FIG. 15, with said cables appropriately fastened and cassette cover 81 secured in place, cassette 80 and cables, including switched positive cable 6A' and network cable 14', is inserted into battery bank 61 as shown in FIG. 16, with the aid of locating chamfers, including chamfer 80D, on leading end of the cassette. With cassette 80 insertably positioned within chamber 91 of said battery case, upper and lower closure securing handles 76 and 73, respectively, are rotated into securing positions in handle recesses 76R and 73R, respectively, along the arcs of the direction arrows 76C and 73C, respectively, such that securing grooves 76A and 73A, respectively, in battery bank 61 are engaged by said securing handles as shown in FIG. 12. After said securing handles are in their secured positions, removable lock 79 is inserted into lock recess 79R along the path of the direction arrow 79C such that the access switch button 79B, spring-loaded to open and located in the innermost portion of lock recess 79R, is engagedly forced inward to complete the normally closed circuit of an access sensor 86E shown in FIG. 17. After key lock 79 is fully inserted into said lock recess, a key lock flange 79F engages the complementary flange grooves 76F and 73F on securing handles 76 and 73, respectively, such that after a key 79K, shown in FIG. 16, is rotated to lock said removable lock in place through lock salients engaging salient notches, which are not shown, in the sides of recess 79R, securing handles 76 and 73 cannot be reversely disengaged to unlock and remove said cassette from battery bank 61 without access switch button 79B sensing such disengaging action. The access switch is operatively connected to access sensor 86E.

Using operator-programmable software procedures stored in a portion of memory 90A, microcomputer 90 in FIG. 18 programably periodically samples sensor input signals, including those from tilt/upset sensor 86F, motion sensor 86L, battery current sensors 86A and 86B, battery voltage sensors 86C and 86D, and battery temperature sensors 86J and 86K. Microcomputer 90 also initiates periodic checks of the network's integrity through access sensor 86E and in league with all network application nodes, through use of timers 90B, provides programmably modifiable network application node services, and provides processing services for operator control and programing changes through network interfaces. These services allow it to control devices such as latching switches 68A and 69A and network 14A" functions in order to provide security, safety, network application node services, and optimal battery maintenance. Sensors may be used separately or in combination to provide varying degrees of safety, security, and operational control in situations which range from those which are clearly defined and, therefore, can be anticipated, to those which are more complex and difficult to anticipate.

In a vehicular application and viewed from the limited perspective of the system and its sensors, for example, tilt/upset sensor 86F, motion sensor 86L, and access sensor 86E provide several different meanings when their signals are transmitted depending upon the context. If the vehicle is not operating, the tilt signal may mean that the vehicle is being lifted by a tow truck, i.e., the vehicle is probably being hauled away, and, should motion sensor 86L subsequently begin sending motion signals, that probability is confirmed that the vehicle is being hauled, perhaps stolen. When the vehicle is operating and a motion signal is transmitted, an abrupt series of tilt signals may mean that the vehicle has driven off the road. The same scenario accompanied by an access-sensor signal may mean that the vehicle has collided with an object forcefully enough to dislodge or fracture the battery or cassette. Clearly, the remaining uncertainties in these scenarios can be more finely resolved with the addition of more sensors, application devices, of different types and with different operating parameters.

For example, a collision impact sensor or a signal from an air-bag collision sensor could be included in the networked ensemble of sensory signals used both to distinguish one situation from the other in the foregoing examples and to provide increasingly finer distinction between similar but unanticipated situations. That is, multiple, inexpensive force sensors could, working in concert, accurately determine the force and relative direction of a collision impact and the weight of each person in the passenger compartment to inflate appropriate airbags selected from a bank of such bags to cushion each person specifically. Inexpensive networked sensors could similarly be used in anti-skid vehicle systems. Using the foregoing scenarios, the capability of a secure personal applications network can be seen to be easily scalable with a greater-than-linear progression of overall capability with each judiciously selected application device added.

Description and Operation of Network and Node Security Programs FIGS. 19 and 20

Referring now to FIG. 19 which is a flow chart of the network security program including a main procedure 100 which resides in memory 90A in FIG. 18 and, at appropriate times, controls microcomputer 90, which further controls portions of timers 90B and network interface 71C, in FIG. 18. The designation of timers cited in the program flow charts do not necessarily refer to specific timers within timers 90B in microcomputer 90. The numerals pertaining to programmed computer routines or programs, including procedures, statements, and operations such as comparisons, are enclosed by brackets in order to improve readability; cited electronic components generally refer to FIG. 18. Network security main procedure 100 begins after microcomputer 90 in FIG. 18 is energized and, after appropriate safeguard routines including requiring the use of a password or personal identification number or other security-checking schemes, said microcomputer circuits step through network security main procedure 100 routines including operator-controlled network and node setup and parameter selection routines as well as locating and establishing system and network application node resources and their relative location in an INITIALIZE <101> statement. Network nodes are sent polling requests, by way of network 14' in FIG. 18, to communicatively respond in order or relative position to the base node, circuits associated with network interface 71C, in a POLL NODES <102> statement. If the number of nodes responding equals the number of nodes polled or, alternatively, the responding order of nodes is the same as the network configuration table in base node memory 90A, an ALL POLLED RESPOND? <103> comparison is evaluated in the affirmative, or YES, an INCREMENT POLL COUNT <106> is reset to zero, and the program diverges to a poll-cycle timer procedure 115 commencing with a START TIMER 1 <116> statement. When START TIMER 1 <116> resets and starts a timer in timers 90B, said microcomputer circuits process a READ TIMER 1 <117> statement, which causes said microprocessor circuits to read the elapsed time accumulated on said timer. Completing poll-cycle timer 115 is the TIMER 1 ≧R? <118> comparison which resolves the question, Does timer 1 show a cumulative period of time which is greater than or equal to the variable R?, where the variable R of said comparison <118> is a cumulative, operator-programmable, period of time. If said comparison <118> shows the cumulative period of time units of said timer is less than said variable R, or evaluates in the negative, or NO, said procedure 115 loops back to statement READ TIMER 1 <117> in which said timer is read again, and processing of said procedures continues until a time period has elapsed such that said timer is greater than or equal to said variable R. Normally, comparison <118> is ultimately answered in the affirmative, or YES, and said computer circuits diverge from processing procedure 115 to resume processing at statement POLL NODES <102>. At statement POLL NODES <102>, network nodes are polled again in a continuing loop provided that no exceptions occur in the network and system.

Continuing with FIG. 19, in the event that all nodes do not respond such that the comparison between the number of network nodes determined at the INITIALIZE statement and the number of said nodes responding after a POLL NODES <102> statement are not equal, in which ALL POLLED RESPOND? <103> comparison is answered in the negative, or NO, a processing exception occurs in which the silent or non-responding node identification numbers (ID#) are recorded in base-node memory 90A by a procedure RECORD SILENT NODE(S) <104>; using the map, or ordered list, of recorded ID#, the network location of the added node is assumed to be at the first non-responding node's original location. Processing resumes at a comparison RECONFIG. NOTIFICATION? <105> which determines whether the authorized operator has initiated a network reconfiguration command by way of wireless computer 20' in FIG. 16 as a time-and-date-stamped entry in a non-volatile portion of memory 90A. If RECONFIG. NOTIFICATION? <105> comparison is determined in the affirmative, or YES, processing diverges to a time-limited reconfiguration procedure 120 beginning with a RECONFIG. SYSTEM <121> procedure. In this procedure the network base node determined, from information gained in the RECORD SILENT NODE <104> procedure, the relative location of the added node and the functions and range of operating parameters of the new application device or devices added. The function of application nodes and their application devices and their operating parameters are provided by the application nodes from nonvolatile-memory portions of memory 13E in FIG. 3. The revised map, or ordered list, of network nodes, their characteristics, and those of the system controlled, is then stored in the base-node memory. Selection of the actual operating parameters of nodes is performed by the operator during INITIALIZE <101> procedure. A START TIMER 2 <122> procedure starts a timer in base node timers 90B in FIG. 18 as a security precaution to limit the time period that the network is abnormally configured. Timer 2 is read at a READ TIMER 2 <123> procedure and is evaluated at a TIMER 2≧S? <124> comparison, where the variable S is a programmable variable. If evaluated in the negative, or NO, processing loops back to READ TIMER 2 <123> procedure until sufficient time accumulates such that TIMER 2≧S? <124> evaluates in the affirmative, or YES. The next statement processed is a RE-INITIALIZE? <125> alternative, which is programmably established or operator selectable as required by the system application, during which RECONFIG. NOTIFICATION? <105> is reset to negative, or NO. If RE-INITIALIZE <125> evaluates to YES, the system resets and processing resumes at INITIALIZE <101>. START TIMER 2 procedure can be implemented in parallel with the aforementioned RECONFIG. SYSTEM <121> procedure. If RE-INITIALIZE? <125> evaluates to NO because, for example, the controlled system must be returned to service immediately and processing resumes at INCREMENT POLL COUNT <106>.

Continuing with FIG. 19, the cumulative number of unsuccessful polling attempts is recorded in INCREMENT POLL COUNT <106> statement and microcomputer circuits 90 processing proceeds to a comparison of the number of polling attempts with the programmable variable X in the COUNT≧X? <107> comparison. If COUNT≧X? <107> comparison fails, i.e., is answered in the negative, or NO, processing loops back to POLL NODES <102> statement and proceeds successively to ALL NODES RESPOND? <103> comparison, thence, successively passing, assuming in this example that one or more network nodes fail to respond, and it is recorded in RECORD SILENT NODE(S) <104>, and that no RECONFXG. NOTIFICATION? <105> has been provided, to INCREMENT POLL COUNT <106> statement, and to COUNT≧X? <107> comparison again. This loop repeats until the number of polling attempts is greater than or equal to programmable variable X. If said COUNT≧X? <107> is true, i.e., is answered in the affirmative or YES, computer circuits 90 subsequently process a CHECK SYSTEM STATUS <108> procedure including identifying and checking the functioning of the nonresponding application node and adjacent nodes and checking network integrity which includes checking continuity, network node power supply voltage, rechecking node access sensors of the system's node cases, and monitoring other sensors for abnormal conditions. In the event said system status is found to be normal with the exception of a single nonresponding node, for example, and said nonresponding node is not a critically important node, then the NORMAL OPERATION? <109> comparison is answered in the affirmative, or YES, which causes said processing to proceed to the ALERT STATE 1 <110> procedure. Depending upon the degree to which a particular embodiment of the secure personal applications network is extended with optional application nodes, ALERT STATE 1 <110> causes one or more programmable visual, graphical, audible warning statements, and other methods for alerting the system operator. Said ALERT STATE 1 is overridden by operator action or cleared to resume the program at ENTER after the system problem has been corrected.

Referring yet to FIG. 19, in the event said system status is not normal such that, for example, a plurality of nodes fails to respond or one or more network, node, or application access sensors have been activated, then NORMAL OPERATION? <109> comparison is answered in the negative, or NO, which causes processing to diverge to the network security mode procedure 130 beginning with an ALERT STATE 2 <131> procedure. ALERT STATE 2 <131> causes one or more programmable, and programmably cryptic or secret, visual, graphical, audible warning statements or methods for alerting the system operator, including programmably initiating a wireless communications procedure to automatically notify respondents at certain telephone numbers about the existence of said alert condition. With the completion of said ALERT STATE 2 procedure, microcomputer circuits 90 will then process the START TIMER 3 <132> procedure which is the beginning of a programably timed delay which precedes eventual full operational security condition of the network and controlled system. After said TIMER 2 is started, it is read at the READ TIMER 3 <133> and if, in the following comparison, the TIMER 3≧T? <134>, where T is a programably variable time period, is evaluated as not true, or NO, said microcomputer circuits will then loop back to READ TIMER 3 <133> procedure. Provided that the situation causing said ALERT STATE 2 remains unaltered, additional programably and controllably modifiable responses are possible, comparison TIMER 3≧T? <134> is evaluated in the affirmative, or YES, and said microcomputer circuits process the SECURITY MODE 1 <135> procedure. SECURITY MODE 1 <135> procedure imposes a programmable, high degree of security and safety on the controlled system. For example, in a vehicular application in which the vehicle is motionless with engine off and door locks set or locked, SECURITY MODE 1 <135> would be programmed, for example, to prevent the starting of a vehicle engine by opening battery switches 68 and 69 in FIG. 12, implementing the security modes of network applications such as the gear selector lever being mechanically locked in "park" position, initiating wireless communications to notify security and police dispatchers, initiating alarm devices, initiating the flashing of vehicle lights including a window-mounted strobe light, the broadcasting of prerecorded verbal messages, and initiating the release of irritants. A vehicle in authorized operation would respond differently in said SECURITY MODE 1 and, because it might be involved in a collision, as described above, indicated by a tilt/upset sensor 86F and a motion sensor 86L, for example, said conventional alarm systems, flashing of headlights, broadcasting of messages, and the release of irritants would not be automatically initiated. However, the locking of the gear selector in "park" position and the opening of battery switches 68 and 69, for example, would be appropriate, yet could also be overridden by authorized operators using wireless computer 20' in FIG. 16. After correcting the situation causing SECURITY MODE 1 <135> procedure, the system is reset at ENTER and re-initialized at INITIALIZE <101>.

Referring now to FIG. 20 which is a flow diagram of a security program for a separate circuit or network node that has already been installed in the network such as that shown in FIG. 3 which contains a microcomputer 13D and its associated circuits located within electronics enclosure 13 and is similar in operation to network security program in FIG. 19. The node security main procedure 140 begins with ENTER upon energizing and, after appropriate safeguard routines including requiring the use of a node password or personal identification number or other security-checking schemes, said node microcomputer circuits step through node security main procedure 140 procedures including locating and establishing the application node system and determining what network resources, that is, what types of nodes are connected to the network system, in an INITIALIZE <141> statement. A waiting-for-poll timing loop is reset and begun with a START TIMER 1 <142> statement in which said node waits a programmably set period for network security main procedure 100 in FIG. 19 to send to subject node a polling request for response. Said microcomputer processing proceeds to a READ TIMER 1 <143> statement, which determines the accumulated passage of time since said START TIMER 1 initiation, which accumulation of elapsed time is compared to programmable variable U in a TIMER 1≥U? <144> comparison, where U is a programmably variable time period. If said TIMER 1≥U? <144> comparison is evaluated in the negative, or NO, processing loops back to READ TIMER 1 <143> to resume processing in that loop until comparison TIMER 1≥U? <144> is evaluated in the affirmative, or YES. When TIMER 1≥U? evaluates in the affirmative, or YES, processing proceeds to a POLL REQUEST RECEIVED? <145> comparison which evaluates in the affirmative, or YES, if subject node receives a polled request for response from the network base node, in which case processing diverges to a programmable cycle-interval timed loop 155 after resetting an INCREMENT POLL COUNT <147> to zero. Said cycle-interval timed loop resets and commences with a START TIMER 2 <156> statement, which starts node microcomputer circuits timer 2, then proceeds to a READ TIMER 2 <157> statement, which reads the accumulated passage of time of said timer 2, and, finally, to a comparison TIMER 2≥V? <158>, where V is a programmably variable time period. If TIMER 2≥V? <158> evaluates in the affirmative, or YES, processing resumes at START TIMER 1 <142> statement. If, however, TIMER 2≥V? <158> evaluates in the negative, or NO, processing repeats, returning in the loop to READ TIMER 2 <157>.

Referring still to FIG. 20, if POLL REQUEST RECEIVED? <145> evaluates in the negative, or NO, a RECONFIG. NOTIFICATION? <146> is evaluated to determine whether or not an operator-initiated reconfiguration command resides in memory 13E. If such a command sequence is retrieved, i.e., the RECONFIG. NOTIFICATION evaluates in the affirmative, or YES, processing resumes at a timed reconfiguration cycle 160 starting with a RECONFIG. SYSTEM <161> procedure. In the RECONFIG. SYSTEM <161> procedure, the function of each new or added network node and its application devices, including their range of operating parameters, are provided to the network and to intercommunicating nodes from the added node's nonvolatile memory. The revised ordered map, or list, of the network's nodes, their characteristics, and those of the system controlled, is then stored in the base node memory. The same map, or the local portion of such a map which includes only the nodes with which any given node can intercommunicate, or both maps, depending upon the network use, can be written to each network node's memory. Operator selection of the actual operating parameters of nodes occurs during INITIALIZE <101> procedure in FIG. 19. After RECONFIG. SYSTEM <161> procedure begins, a START TIMER 3 <162> procedure starts a timer in base node timers 13E in FIG. 3 as a security precaution to limit the time period that the node is abnormally configured. A READ TIMER 3 <163> procedure provides the accumulated time from said timer to a TIMER 3≥W? <164> comparison which evaluates the reported time accumulation in comparison to the programmable variable W. If TIMER 3≥W? <164> comparison evaluates to the negative, or NO, processing loops back to READ TIMER 3 <163> statement, and continues to do so, until TIMER 3≥W? <164> evaluates to affirmative, or YES, in which case RECONFIG. NOTIFICATION? <146> is reset to the negative, or NO, and processing resumes at INCREMENT WAIT COUNT <147>.

Continuing with FIG. 20, a programmably variable number of waiting-for-poll periods is counted and the count is accumulated in INCREMENT WAIT COUNT <147> statement. Said INCREMENT WAIT COUNT statement is evaluated at a COUNT≥Z? <148> comparison where Z is a programmably variable count number. If COUNT≥Z? <148> evaluates in the negative, or NO, processing resumes at the beginning of the waiting-for-poll timing loop, START TIMER 1 <142>. If COUNT≥Z? <148> evaluates in the affirmative, or YES, that is, the sum of waiting-for-poll counts exceeds or equals Z count number, processing proceeds to a CHECK SYSTEM STATUS <149> statement. CHECK SYSTEM STATUS <149> procedure causes the secure personal applications network node to test, to a programmably variable degree, the portion of the network which is communicatively accessible to said node in order to determine the operational status of the network, its intercommunicating nodes, and their application devices and is evaluated in the NORMAL OPERATION? <150> comparison. If NORMAL OPERATION? <150> comparison, which polls network nodes according to a reference list, stored in subject node's non-volatile memory and made current upon initialization, evaluates in the affirmative, or YES, processing proceeds to an ALERT STATE 3 <151> procedure. ALERT STATE 3 <151> procedure is similar to ALERT STATE 1 <110> condition in FIG. 19 and, depending upon the capabilities of the network and network application nodes communicatively accessible to subject application node, causes programmable visual, graphical, audible warnings or other methods for alerting the system operator either directly or through another node having such operator-interface capabilities with which said node can still intercommunicate. ALERT STATE 3 <151> condition is overridden by authorized operator action or cleared to resume the program at ENTER after the problem causing the condition is corrected.

Referring again to NORMAL OPERATION? <150> comparison in FIG. 20, in the event said system status is not normal such that, for example, there is, in addition to the non-polling base node, detected loss of network integrity such as one or more nonresponding nodes or one or more network, node, or application access sensors that have been activated, then NORMAL OPERATION? <150> comparison is evaluated in the negative, or NO, which causes said processing to diverge to the node security procedure 170 beginning with an ALERT STATE 4 <171> procedure. ALERT STATE 4 <171> causes, depending upon the capabilities of subject application node and other network application nodes with which subject node can intercommunicate, one or more programmable, and selectably cryptic or secret, visual, graphical, audible warning statements and other methods for alerting the system operator, including programmably initiating a wireless communications procedure to automatically notify respondents at certain telephone numbers about said alert state, such as security and police departments. With the completion of said ALERT STATE 4 <171> procedure, timer 4 is started at the START TIMER 4 <172> procedure which is the beginning of a programmably timed period of delay which precedes the eventual operational security condition of the controlled system. After said TIMER 4 is started, it is read at a READ TIMER 4 <173> and if, in the following comparison, TIMER 4≧Y? <174>, where Y is a programmably variable period of time, is evaluated in the negative, or NO, processing then loops back to READ TIMER 4 <173> procedure. Provided that the situation causing said ALERT STATE 4 remains unaltered, additional programmably and controllably modifiable operator responses are possible, comparison TIMER 4≧Y? <174> is evaluated in the affirmative, or YES, and processing continues at a SECURITY MODE 2 <175> procedure. SECURITY MODE 2 <175> procedure imposes a programmable, high degree of security and safety on the controlled system. For example, in a building network application in which the secure personal applications network application node is a heating, ventilation, and air conditioning (HVAC) controller and a portion of network 14' in FIG. 16 adjacent to said network application node is rendered inoperable which communicatively separates said node from the base node in FIG. 16. Such severing of either the network or node power, or both, may be due to workmen's accident, catastrophe, simple tampering, or intrusion. In SECURITY MODE 2 <175> said node may be programmed to provide a distinctive, audible alarm and a message describing the loss of network connection on the temperature display component of said application node in such situations and alert the operator thereby. From RETURN, recovery from SECURITY MODE 2 <175> condition is made when the authorized operator, after correcting the problem or problems causing the condition, re-initializes the security program at INITIALIZE <141> after resetting the network and program system at ENTER.

Description of the Extended Network FIG. 21

Referring now to FIG. 21 which is a block diagram of an exemplary extended network of application nodes of the secure personal applications network for vehicles shown in FIGS. 12 through 18. Network 14A" and node power lead 14B", which may include a negative or ground lead, are combined in network cable 14' which is operatively connected to network node 21' and, by way of network extension cable 14X', to network node 26. Network nodes 21' and 26 are operatively connected to application engine-kill switch 21A' and application RF/IR transceiver 26A, respectively, where RF/IR stands for radio frequency or infrared media, or both. The connection method of network nodes 21A' and 26 are similar to that shown in FIG. 16 with the exception that network terminator 26B is replaced by network cable extension 14X' and network terminator 26B is connected to node 208 in FIG. 21. Said engine kill-switch application device provides an added measure of anti-theft protection for vehicles by programmably and controllably interrupting engine ignition. RF/IR transceiver 26A provides communication medium 20B' to wireless computer 20', which includes RF/IR transceiver 20C', and keypad & display 20D', which may be a touch-screen controlled device, used by authorized operator to control and program said network and network application nodes. Additional extension cables like network extension cable 14X' are used to connect additional network nodes like nodes 201 through 208 with operatively connected application devices 201A through 208A, respectively. Network terminators 22B and 26B are necessary for terminating certain, though not network types. For example, the Small Computer System Interface (SCSI) specification, a parallel bus configuration, requires such a termination device whereas the IEEE P1394 specification, a serial bus configuration which is also called "firewire" by Apple Computer Corporation, does not require such a termination. network types not requiring termination, network terminators 22B and 26B act as caps to prevent contamination of the network contacts by dirt, moisture, and oil.

The secure personal applications network can also be implemented as a wireless network, i.e., a network using electromagnetic wave radiative media, instead of a hardwired or wired, i.e., wire or cable, network (not shown). Individual nodes would necessarily include their own power sources.

Operation of the Extended Network FIG. 21

The network application nodes or separate networks in FIG. 21 of the preferred embodiment shown in FIGS. 12 through 17 operate in a peer-to-peer mode with the base node periodically checking the network for integrity, i.e., the network's communication carrying ability and normal electrical parameters, as mentioned above, by polling said nodes as shown in network security main procedure 100 in FIG. 19. In the event one or more network application nodes fails to respond to a poll request, the base node, or network logical circuits, enters, separately or together, alert and security condition modes, the latter according to network security procedure 120 in FIG. 19. When polled by said base node, said network application nodes communicate in response or, alternatively, initiate network checks prior to entering alert and security modes, the latter of which is shown in node main procedure 130 and node security procedure 150 in FIG. 20. Operator programming and control of network 14' are accomplished by way of network node 26 and its application device, RF/IR transceiver 26A, through communication medium 20B' using wireless computer 20', which includes RF/IR transceiver 20C' and keypad & display 20D'. Network node 26 routes communication to its ultimate addressees, such as network base node, shown in FIG. 18, or other network nodes. Under normal operating conditions, network application nodes function as they are programmed to function: engine kill switch 21A of network node 21 switches off one or more vehicle ignition/starter circuits as one layer of preventing unauthorized engine starting; RF/IR transceiver 26A of network node 26 provides a communication interface with wireless computer 20' as mentioned above; a fuel valve operator 201A of the network node 201 shuts off the vehicle's fuel supply as a second layer of theft security by preventing unauthorized engine starting/ running; an alarm 202A application device of the network node 202 programmably energizes various types of visual and audible alarms and can be programmed to initiate the operation and security condition of other network application nodes; a GPS 203A application device of the network node 203 is a global positioning by satellite (GPS) receiver which provides position information, as longitude, latitude, and absolute altitude, for assisting the vehicle operator, for other network application nodes on demand, such as a cell/PCS telephone 207A application device and the network node 207 during emergencies or security conditions, and for other communications functions; the perimeter sensors 204A application device of the network node 204 programmably provide vehicle operator safety and assistance through active sound or ultrasonic ranging for obstructions on either side and behind the vehicle and, for security purposes, passively listening when the vehicle is unattended; an anticollision RADAR 205A application device of the network node 205 provides active electromagnetic wave radiation ranging ahead and behind to detect rapidly approaching objects relative to the vehicle and initiates appropriate warnings; a remote starter 206A of the network node 206 provides the authorized operator the ability to start and warm the vehicle engine from outside the vehicle during cold days or for purposes of periodic engine maintenance; the aforementioned cell/PCS telephone 207A application device of network node 207 is a combination cellular and personal communication system (PCS) telephone which, in addition to its normal telephony use, provides an automatic communications interface for use during emergencies like vehicle disablement or overturning, such as sensed by tilt/upset sensor 86F in FIG. 18 described above, during security conditions in which the vehicle is being towed or hauled, sensed by tilt/upset sensor 86F and motion sensor 86L in FIG. 18, in such overturning, disablement, towing, or hauling cases, GPS 203A of network node 203 would initiate ongoing position information reporting. A network integrity loss or security condition, which can be initiated by any network node, may occur through an access sensor signal, such as access sensor 86E in FIG. 18, and can be initiated locally such as at the base node, a network node, or an application device, or through the loss of network integrity, or by the programmed action of a network application node, that is, by a network node or its application device.

An added device 208A of the network node 208 represents one or more additional network application nodes; new nodes can be added by removing terminator 26B, adding a network extension cable, such as extension cable 14X', of the appropriate length, connecting the appropriate connector of the added network application node to the new cable, and placing said terminator on the end of the appropriate network application node fitting.

In a wireless network embodiment (not shown), periodic network integrity checks of the network can include the medium's transmissivity and freedom from interference, monitoring each node's signal strength, and checking each node's location or position. Each node can be programmed to check whether it is moving or has moved through the use of motion or acceleration sensors or by a global positioning by satellite (GPS) position fix. Additionally, each node's relative position can be determined through triangulation of the node's signal direction or angle of origination with other nodes of the network, either unilaterally or in combination. In networks in which the nodes are geographically widespread, GPS location fix, either direct or referenced to a ground station, can augment the node position check.

CONCLUSIONS, RAMIFICATIONS, AND SCOPE OF THE INVENTION

The secure personal applications network has been described with reference to exemplary and preferred embodiments which the reader can see provide a high degree of accessible usefulness, extensibility, and robustness such that an embodiment may be easily and securely operated by a person having little technical knowledge. In addition, embodiments of this network will provide a richness of capability exceeding that of the personal computer (PC). It must be remembered that the descriptions herein, including the program flow charts, are static representations of the actions of dynamic nodes, which, acting in concert as a network, are capable of providing very complex behavior. Because all network nodes intercommunicate, embodiments have in common the ability to exhibit system-wide, progressively increased capability beyond the incremental addition of application devices: each added unit of application device can provide more than one unit of increased capability to the network system and, therefore, to the persons using it.

While the secure personal applications network contains many specific elements, these elements should not be construed as limiting its scope. Many other variations are possible. For example, a wireless network or a network having a plurality of channels, physical, logical or virtual, may be substituted, either entirely or in part, for the network described herein. Also, the network's architecture may be serial or parallel, synchronous or asynchronous or a mix of the two, may employ a master-slave serial bus or a switched-stream, multiple channel, asynchronous transfer mode (ATM) control method, and may be physically or logically arranged in any topological configuration, including tree, star, loop, or combinations thereof.

The network, particularly the network-node power-supply portion, may be separate from the network and may include fewer or more conductors, including, for example, the elimination of the negative or ground lead, providing such a negative or grounding function is otherwise provided. Further, the number and types of sensors may be different from those shown in the embodiments to suit specific applications. In addition, the number and types of power sources, including sizes and types, may be varied from those described or additively multiplied. Similarly, the number, orientations, and locations of electrodes in the chambers of power sources, including capacitors and batteries, and banks of power sources may vary from those shown. For example, both positive and negative electrodes may be located at one or either end of the chamber within the power source.

Accordingly, various other substitutions, modifications, changes, and omissions may be made in the design and arrangement of the elements without departing from the spirit of the invention as expressed in the appended claims.

I claim:

1. A modular, substantially distributed, digital electronic, complex multiple-function, including computing, entertainment, heating system control, and vehicle security functions, substantially independently functioning, network system comprising:

a. a user extensible digital electronic network, b. a plurality of programmable network communicating nodes, which may connect to communications devices or other computer systems, each of which includes memory and is operatively connected to one or more application devices and a power supply, and c. program means to cause said nodes to digitally intercommunicate using said network and, upon the loss or impending loss of network integrity, cause said nodes to substantially actively modify the action of one or more of said devices, including triggering an alarm and automatically initiating a telecommunicated message, whereby said network and said nodes enter, and cause controlled systems to enter, into programmably useful, including secure and safe, conditions.

2. The network system in claim 1 wherein said network is substantially removably, including unpluggably and destructively, accessible to deleterious circumstances, including unauthorized persons, and said loss of network integrity includes the loss or impending loss of said intercommunication, including the detection of access to said nodes or said application devices, and the loss of power, whereby said network and said nodes severally enter, and cause said application devices to enter, into programmably useful, including secure and safe, conditions.

3. The network system in claim 2 wherein said memory includes information about the nodes comprising said network, including the functions, parameters, and locations of said nodes, which said program means programmably modifies when said network is altered, including by the addition of one or more nodes, whereby said network is easy for the operator to alter or extend and, thereby, serve to increase the capacity and concerted activity complexity of said nodes through the gain in synergy due to the number and type diversity of devices and nodes added to said network.

4. The network system in claim 3 wherein each of said nodes and said devices includes a power storage unit which is isolable from said power supply, whereby said network and nodes continue to function without normal power supply in order to enter, and cause said application devices to enter, into programmably useful, including secure and safe, conditions.

5. The network system in claim 4 wherein said power supply is selected from the group consisting of capacitors and batteries whereby said network, said nodes, and said devices can continue to function without an external power source.

6. The network system in claim 5 wherein at least one of said nodes or said application devices includes at least one sensor means to detect physical characteristics and events, including voltage, current, and temperature of said power supply whereby said node can modify the action of one or more of said devices, including other nodes, such that said network and said nodes enter, and cause said application devices to enter, into programmably useful, including safe and secure, conditions.

7. The network system in claim 2 wherein said application device is a switchable connection means which programmably interrupts electrical power to loads, including plant equipment and vehicle starting motors, is electrically attachable to the electrodes or terminals of said power supply, and includes attachment means to fasten said switchable connection means to said electrodes or terminals, whereby important or potentially dangerous equipment can be left unguarded.

8. The network system in claim 7 wherein said switchable connection means is located substantially within an enclosure providing attachment means to connect said switchable connection means to said electrodes or terminals and mechanically fasten said enclosure to appropriate structure associated with said power supply, whereby said network may be installed in a vehicle, including a boat or an aircraft, by attachment to a battery of said vehicle.

9. The network system in claim 8 wherein said enclosure is openable and securely closable and includes at least one sensor to detect the opening of said enclosure, including other physical characteristics and events, whereby said network and said nodes enter, and cause said application devices to enter, into programmably useful, including safe and secure, conditions.

10. In combination, at least one power storage unit with positive and negative electrodes in which said electrodes are substantially located within an internal, substantially enclosed chamber, a. positive and negative electric terminals,
 b. at least one electric connection means interposed severally between said electrodes and said terminals,
 c. one or more electric circuits operatively connected to said electrodes of which at least one of said circuits is an extensible electronic network with memory and means to communicate with separate electronics circuits, of which at least one includes memory whereby said circuits and connection means continue to operate without external power and are safeguarded from tampering and exposure.

11. The power storage unit in claim 10 further including
 a. at least one external opening which substantially provides access to said chamber and
 b. at least one insertable and withdrawable cassette which substantially occupies said chamber and substantially contains said electric circuits, said electronic circuits, said positive and negative terminals, and said electric connections, and means for operatively severally connecting said electrodes to said positive and negative terminals when said cassette is inserted or operatively disconnecting said electrodes from said terminals when said cassette is withdrawn from said power storage chamber whereby cables and operative control can be easily incorporated into said electric and electronic circuits, respectively, in said chamber.

12. The power storage unit in claim 11 further including program means to cause said separate, network communicating, electronic circuit or circuits to communicate with said network circuit and intercommunicate using said network circuit and, by absence of said communication and said intercommunication or either said communication or intercommunication, including through loss of power, effect control of one or more of said electronic or electric devices, whereby the operation of at least one of said electric circuits is programmably modified.

13. The power storage unit in claim 12 further including user modifiable digital means to communicate with one or more of said circuits such that the network program can be modified whereby the operation of daid network is easily changed by an operator.

14. The power storage unit in claim 13 further including program means to cause said network circuits already residing in said network, or resident circuits, to intercommunicate with one or more added separate circuits such that the memory of one or more of said resident circuits is modified whereby a description of each of said circuits, including its function and location, of said network is stored in the memory of one or more of said circuits.

15. The power storage unit in claim 14 wherein said network circuit includes at least one sensor means to detect physical characteristics and events, including voltage, current, temperature of said power supply, and access to said housing, whereby said circuit operates in a safe, secure, and programmably automatic manner.

16. The power storage unit in claim 15 further including at least one said connection means which is switchably modifiable, whereby one or more loads can be programmably switchably controlled.

17. A method of providing security to computer networks, comprising the steps of:
 a. the network base node requesting from one or more network nodes a response and waiting a programmable period for said response from said network nodes, b. one or more network nodes waiting a programmable period after receiving a request for a new request from said base node, and, c. upon expiration of said period or periods without said base node receiving said response or without said network node or nodes receiving said new request, said nodes severally performing programmable procedures whereby said network base node and said network node or nodes are programmably placed in useful, including safe and secure, conditions.

18. The method in claim 17 wherein said programmable procedures include at least one reconfiguration procedure such that the characteristics of changed network nodes, including added nodes, including application device or devices, are programmably communicated to at least one of said nodes whereby said network is easily extendable and modifiable.

19. The method in claim 18 wherein said characteristics include the location, functions, and range of operating parameters of said changed network nodes, including application device or devices, whereby said network is able to function safely, securely, and usefully in the event of loss of network integrity including authorized modification.

* * * * *